(12) United States Patent
Campos, II et al.

(10) Patent No.: US 10,675,828 B2
(45) Date of Patent: Jun. 9, 2020

(54) ARTICLE OF FOOTWEAR WITH FIRST AND SECOND OUTSOLE COMPONENTS AND METHOD OF MANUFACTURING AN ARTICLE OF FOOTWEAR

(71) Applicant: NIKE, Inc., Beaverton, OR (US)

(72) Inventors: Fidencio Campos, II, Dallas, TX (US); Frederick J. Dojan, Vancouver, WA (US); Zachary M. Elder, Portland, OR (US); Eric L. Fliss, Vancouver, WA (US); Samuel Heinzman, Silverton, OR (US); Troy C. Lindner, Portland, OR (US); Benjamin J. Monfils, Portland, OR (US); Melanie N. Moteberg, Portland, OR (US); Lee D. Peyton, Tigard, OR (US); Eric S. Schindler, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 43 days.

(21) Appl. No.: 15/967,703

(22) Filed: May 1, 2018

(65) Prior Publication Data
US 2018/0244008 A1    Aug. 30, 2018

Related U.S. Application Data

(60) Division of application No. 15/070,082, filed on Mar. 15, 2016, now Pat. No. 9,981,437, which is a
(Continued)

(51) Int. Cl.
*B29C 49/20* (2006.01)
*B29C 51/10* (2006.01)
(Continued)

(52) U.S. Cl.
CPC .......... *B29D 35/122* (2013.01); *A43B 13/122* (2013.01); *A43B 13/16* (2013.01);
(Continued)

(58) Field of Classification Search
CPC . B29C 51/12; B29C 2049/2017; B29C 49/22; B29C 49/50; B29C 2049/0057;
(Continued)

(56) References Cited

U.S. PATENT DOCUMENTS 5,771,606 A * 6/1998 Litchfield ............ A43B 13/203
36/28
7,451,511 B2 * 11/2008 Ellis ..................... A43B 13/026
12/146 B
(Continued)

*Primary Examiner* — Michael A Tolin
(74) *Attorney, Agent, or Firm* — Quinn IP Law

(57) ABSTRACT

A sole structure for an article of footwear comprises a midsole including a polymeric bladder element enclosing a fluid-filled interior cavity, a first outsole component secured to a bottom surface and to a side surface of the polymeric bladder element, and a second outsole component. The first outsole component includes a first base, and a wall integral with the first base. The second outsole component includes a second base secured to the first base, and a wall integral with the second base and secured to the outer surface of the wall of the first outsole component. A method of manufacturing the article of footwear includes thermoforming the bladder element and the first outsole component, and securing the second outsole component to the first outsole component.

13 Claims, 24 Drawing Sheets

Related U.S. Application Data continuation-in-part of application No. 14/641,881, filed on Mar. 9, 2015, now Pat. No. 9,987,814, which is a continuation-in-part of application No. 14/641,789, filed on Mar. 9, 2015, now Pat. No. 9,750,307, which is a continuation-in-part of application No. 13/773,360, filed on Feb. 21, 2013, now Pat. No. 9,420,848.

(51) Int. Cl.

| | | |
|---|---|---|
| *B29C 51/12* | (2006.01) | |
| *B29D 35/14* | (2010.01) | |
| *B32B 27/08* | (2006.01) | |
| *B32B 27/36* | (2006.01) | |
| *B32B 27/40* | (2006.01) | |
| *A43B 13/12* | (2006.01) | |
| *A43B 13/16* | (2006.01) | |
| *A43B 13/20* | (2006.01) | |
| *A43B 13/22* | (2006.01) | |
| *B29D 35/12* | (2010.01) | |
| *B32B 7/05* | (2019.01) | |
| *B32B 1/00* | (2006.01) | |
| *B32B 3/26* | (2006.01) | |
| *B29C 51/26* | (2006.01) | |
| *B29L 31/50* | (2006.01) | |
| *B29C 49/00* | (2006.01) | |

(52) U.S. Cl.
CPC ............ *A43B 13/20* (2013.01); *A43B 13/206* (2013.01); *A43B 13/223* (2013.01); *B29C 51/105* (2013.01); *B29C 51/12* (2013.01); *B29C 51/265* (2013.01); *B29D 35/128* (2013.01); *B29D 35/142* (2013.01); *B32B 1/00* (2013.01); *B32B 3/26* (2013.01); *B32B 7/05* (2019.01); *B32B 27/08* (2013.01); *B32B 27/36* (2013.01); *B32B 27/40* (2013.01); *B29C 2049/0057* (2013.01); *B29C 2049/2086* (2013.01); *B29L 2031/504* (2013.01); *B32B 2437/02* (2013.01); *Y10T 428/24802* (2015.01)

(58) Field of Classification Search
CPC .... B29C 2049/0063; B29C 2049/2086; B29C 51/10; B29C 51/105; B29C 51/14; B29C 51/265; B29C 51/32; B29D 35/12; B29D 35/122; B29D 35/128; B29D 35/142; B29D 35/148; A43B 13/20; A43B 13/122; A43B 13/16; A43B 13/206; A43B 13/223; B32B 1/00; B32B 27/08; B32B 27/36; B32B 27/40; B32B 38/12; B32B 2437/02; B29L 2031/50; B29L 2031/504
See application file for complete search history.

(56) References Cited

U.S. PATENT DOCUMENTS

| | | | | |
|---|---|---|---|---|
| 2002/0113694 | A1* | 8/2002 | Muirhead | ............. B29C 51/267 340/450 |
| 2003/0226280 | A1* | 12/2003 | Paratore | ................... A43B 7/12 36/4 |
| 2005/0132609 | A1* | 6/2005 | Dojan | ................... A43B 13/20 36/29 |
| 2008/0196277 | A1* | 8/2008 | Cook | ................... A43B 1/0036 36/137 |
| 2008/0276490 | A1* | 11/2008 | Holt | ....................... A43B 13/20 36/28 |

\* cited by examiner

ARTICLE OF FOOTWEAR WITH FIRST AND SECOND OUTSOLE COMPONENTS AND METHOD OF MANUFACTURING AN ARTICLE OF FOOTWEAR

CROSS-REFERENCE TO RELATED APPLICATIONS

This application is a divisional application of U.S. patent application Ser. No. 15/070,082, filed Mar. 15, 2016, now U.S. Pat. No. 9,981,437, which application is a continuation-in-part of U.S. patent application Ser. No. 14/641,881, filed on Mar. 9, 2015, now U.S. Pat. No. 9,987,814 which application is a continuation-in-part of U.S. patent application Ser. No. 14/641,789, filed on Mar. 9, 2015, now U.S. Pat. No. 9,750,307, issued Sep. 5, 2017, which application is a continuation-in-part of U.S. patent application Ser. No. 13/773,360 filed on Feb. 21, 2013, now U.S. Pat. No. 9,420,848, issued Aug. 23, 2016, all of which applications are incorporated by reference in their entireties.

TECHNICAL FIELD

The present teachings generally relate to an article of footwear including a sole structure, and to a method of manufacturing the article of footwear.

BACKGROUND

Footwear typically includes a sole structure configured to be located under a wearer's foot to space the foot away from the ground or floor surface. Athletic footwear in particular sometimes utilizes polyurethane foam, rubber, or other resilient materials in the sole structure to provide cushioning.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION

Figure 1:
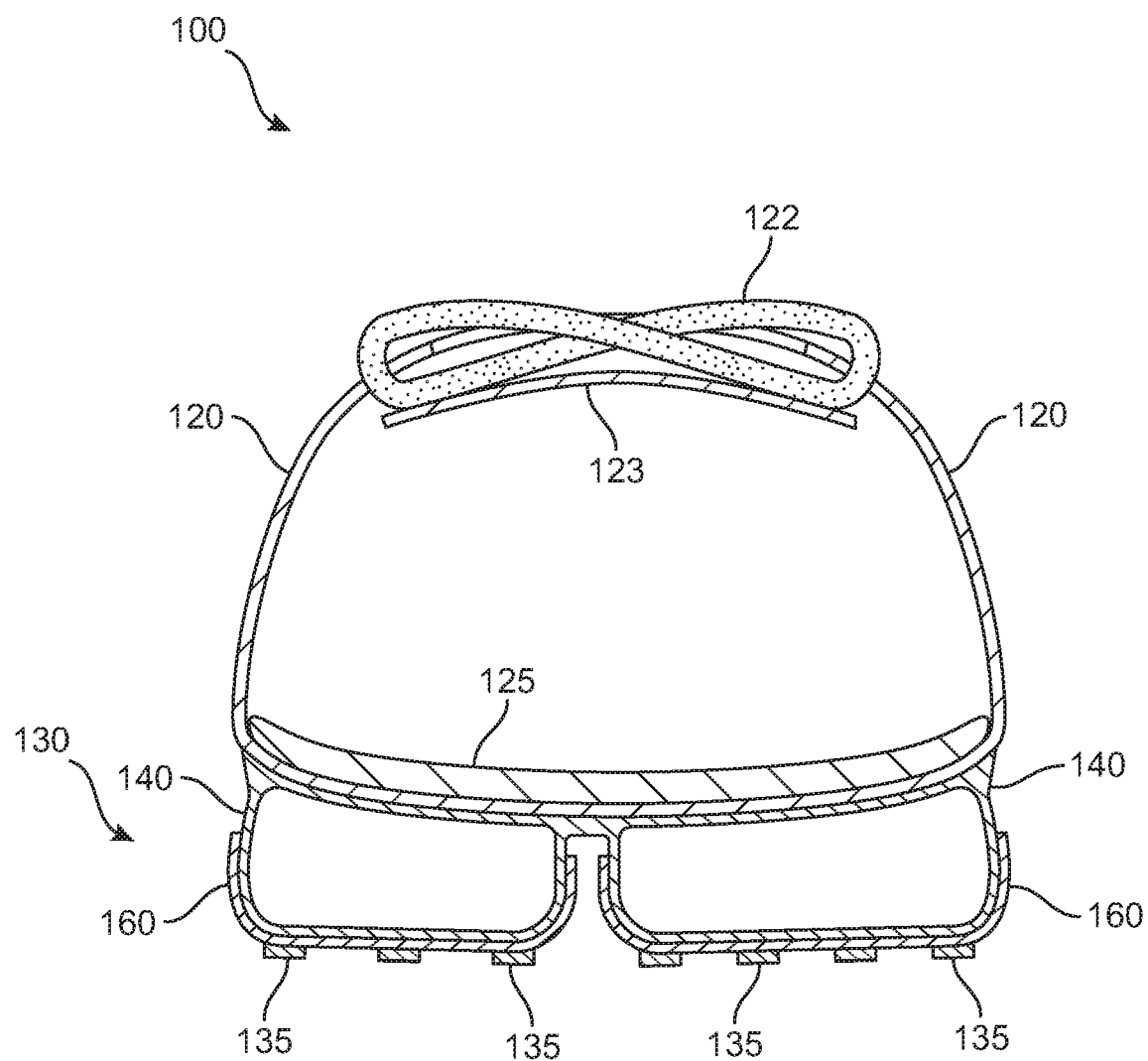
FIG. 1 is a cross-sectional view of an article of footwear including a co-molded article.

A sole structure for an article of footwear includes a midsole having a polymeric bladder element enclosing a fluid-filled interior cavity, a first outsole component, and a second outsole component. The first outsole component is secured to a bottom surface and to a side surface of the polymeric bladder element. The first outsole component includes a first base, and a wall integral with the first base. The second outsole component includes a second base secured to the first base, and a wall integral with the second base and secured to the outer surface of the wall of the first outsole component.

In an embodiment, the first outsole component may be a first material, such as a thermoplastic polyurethane, and the second outsole component may be a second material, such as rubber.

In an embodiment, the bladder element has an arcuate tubular portion in a forefoot region of the sole structure. The side surface of the bladder element is at an inner curved wall of the bladder element at the arcuate tubular portion. In this configuration, the wall of the second outsole component supports and reinforces the inner curved wall of the bladder element, such as during dorsiflexion of the forefoot region.

In an embodiment, the first base has integral tread elements protruding at a first portion of a bottom surface of the first base, but a second portion of the bottom surface is free of any tread elements. The wall of the first outsole component has an outer surface adjacent the second portion of the bottom surface. The second base of the second outsole component is secured to the second portion of the bottom surface of the first base. Accordingly, the first tread elements do not interfere with the second base. Moreover, a ground-engaging surface of the sole structure includes the integral tread elements of the first outsole component and includes the second outsole component. The second outsole component may also have tread elements that are included in the ground-engaging surface.

In an embodiment, the first outsole component is a first material and the second outsole component is a second material different than the first material. For example, the first outsole component may be a thermoplastic polyurethane, and the second outsole component may be rubber. The second material may be selected to provide durability to the ground-engaging surface and reinforcing support to tune the cushioning response of the first outsole component.

In an embodiment, the outer surface of the wall of the first outsole component has a recess adjacent the second portion of the bottom surface of the first outsole component. The wall of the second outsole component may be secured to the outer surface of the wall of the first outsole component in the recess. The wall of the second outsole component is thus nested in the recess, which protects the wall of the second outsole component from forces that could cause delamination. In one embodiment, the wall of the second outsole component has a first thickness, the recess has a first depth, and the first thickness is greater than the first depth so that the second outsole component protrudes outward of the first outsole component at the wall of the first outsole component.

In an embodiment, the wall of the first outsole component is an outer wall of the first outsole component and the wall of the second outsole component is an outer wall of the second outsole component. The first outsole component has an inner wall integral with the first base, and the recess extends only partway up the outer wall of the first outsole component, along the bottom surface of the base, and up the inner wall of the first outsole component. The second outsole component has an inner wall integral with the second base and secured to an outer surface of the inner wall of the first outsole component. The inner wall of the second outsole component extends further upward along the first outsole component than the outer wall of the second outsole component.

In an embodiment, the polymeric bladder element is configured so that at least a portion of the fluid-filled interior cavity has a U shape with an arcuate portion at an outer periphery of the sole structure. The first outsole component has a U shape corresponding to the U shape of the fluid-filled interior cavity with the wall of the first outsole component at the arcuate portion of the fluid-filled interior cavity.

In an embodiment, the second outsole component has a plurality of integral second tread elements protruding from a bottom surface of the second outsole component. The first tread elements and the second tread elements establish a ground-engaging surface of the sole structure.

The article of footwear may include an upper. The midsole, the first outsole component, and the second outsole component may be configured as a forefoot sole structure secured to a forefoot region of the upper, and the sole structure may also include a heel sole structure secured to a heel region of the upper. The heel sole structure may include a midsole with a polymeric bladder element enclosing a separate fluid-filled interior cavity isolated from the fluid-filled interior cavity of the polymeric bladder element of the forefoot sole structure, a first outsole component secured to a bottom surface of the bladder element of the heel sole structure, and a second outsole component secured to the first outsole component of the heel sole structure.

A method of manufacturing an article of footwear comprises placing a preformed first outsole component into a thermoforming mold. The preformed first outsole component has a base with integral tread elements protruding from a first portion of a bottom surface of the base, and with a second portion of the bottom surface free of any tread elements. The first outsole component also has a wall integral with the base and adjacent the second portion of the bottom surface. The method includes placing polymeric material in the thermoforming mold with the first outsole component, and closing the thermoforming mold to enclose the polymeric material and the first outsole component in a mold cavity. A vacuum is applied to conform a first portion of the polymeric material to a first mold surface of the thermoforming mold and to conform a second portion of the polymeric material to an upper surface of the first outsole component and to a second mold surface of the thermoforming mold, with an interior cavity between the first portion and the second portion.

The first portion of the polymeric material may be a first polymeric sheet, and the second portion of the polymeric material may be a second polymeric sheet. The method may further include thermally bonding the first polymeric sheet to the second polymeric sheet to enclose the interior cavity, thermally bonding the lower surface of the second polymer sheet to the upper surface of the first outsole component, and removing the thermally bonded upper and lower polymer sheets and first outsole component from the thermoforming mold as a unit after a predetermined cooling period.

A second outsole component may be positioned on the second portion of the bottom surface of the first outsole component, and adhered to the first outsole component. For example, positioning the second outsole component may be by nesting the second outsole component in a recess in the outer surface of the wall of the first outsole component. Nesting the second outsole component in the recess may include placing an upper edge of the second outsole component along a lip of the first outsole component at an upper extent of the recess.

The method may include securing a footwear upper to an upper surface of the first polymer sheet. The first and the second polymer sheets, the first outsole component, and the second outsole component may be configured as a forefoot sole structure and secured to a forefoot region of the footwear upper, and the method may include securing a heel sole structure to a heel region of the footwear upper with a forward edge of the heel sole structure adjacent a rearward edge of the forefoot sole structure.

The second mold surface may have a positioning marker, and placing the first outsole component into the thermoforming mold may include placing a predetermined portion of the first outsole component at the positioning marker, thereby orienting the first outsole component in a predetermined position in the thermoforming mold.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., may be used descriptively relative to the figures, without representing limitations on the scope of the invention, as defined by the claims.

In an embodiment, the shaped article may be a cushioning layer and an outsole of an article of footwear. FIG. 1 illustrates such an embodiment. FIG. 1 is a cross-sectional view of an article of footwear including a co-molded article. An article of footwear 100 includes an upper 120 and a sole structure 130. Upper 120 provides a comfortable and secure covering for a foot of a wearer. As such, the foot may be located within upper 120 to effectively secure the foot within article of footwear 100 or otherwise unite the foot and article of footwear 100. Sole structure 130 is secured to a lower area of upper 120 and extends between the foot and the ground to attenuate ground reaction forces (i.e., cushion the foot), provide traction, enhance stability, and influence the motions of the foot, for example. In effect, sole structure 130 is located under the foot and supports the foot.

Upper 120 is depicted as having a substantially conventional configuration. A majority of upper 120 incorporates various material elements (e.g., textiles, foam, leather, and synthetic leather) that are stitched or adhesively bonded together to produce an interior void for securely and comfortably receiving a foot. The material elements may be selected and located in upper 120 to selectively impart properties of durability, air-permeability, wear-resistance, flexibility, and comfort, for example. The void in upper 120 is shaped to accommodate the foot. When the foot is located within the void, therefore, upper 120 extends along a lateral side of the foot, along a medial side of the foot, over the foot, around the heel, and under the foot. A lace 122 extends over a tongue 123. Lace 122 and the adjustability provided by tongue 123 may be utilized in a conventional manner to modify the dimensions of the interior void, thereby securing the foot within the interior void and facilitating entry and removal of the foot from the interior void. Sockliner 125 may enhance the comfort of article of footwear 100.

Further configurations of upper 120 may also include one or more of (a) a toe guard positioned in forefoot region and formed of a wear-resistant material, (b) a heel counter located in heel region for enhancing stability, and (c) logos, trademarks, and placards with care instructions and material information. Given that various aspects of the present discussion primarily relate to sole structure 130, upper 120 may exhibit the general configuration discussed above or the general configuration of practically any other conventional or non-conventional upper. Accordingly, the structure of upper 120 may vary significantly.

Sole structure 130 includes outsole 160 attached to fluid-filled chamber 140. Outsole 160 has ground-engaging protuberances 135 associated therewith.

Figure 2:
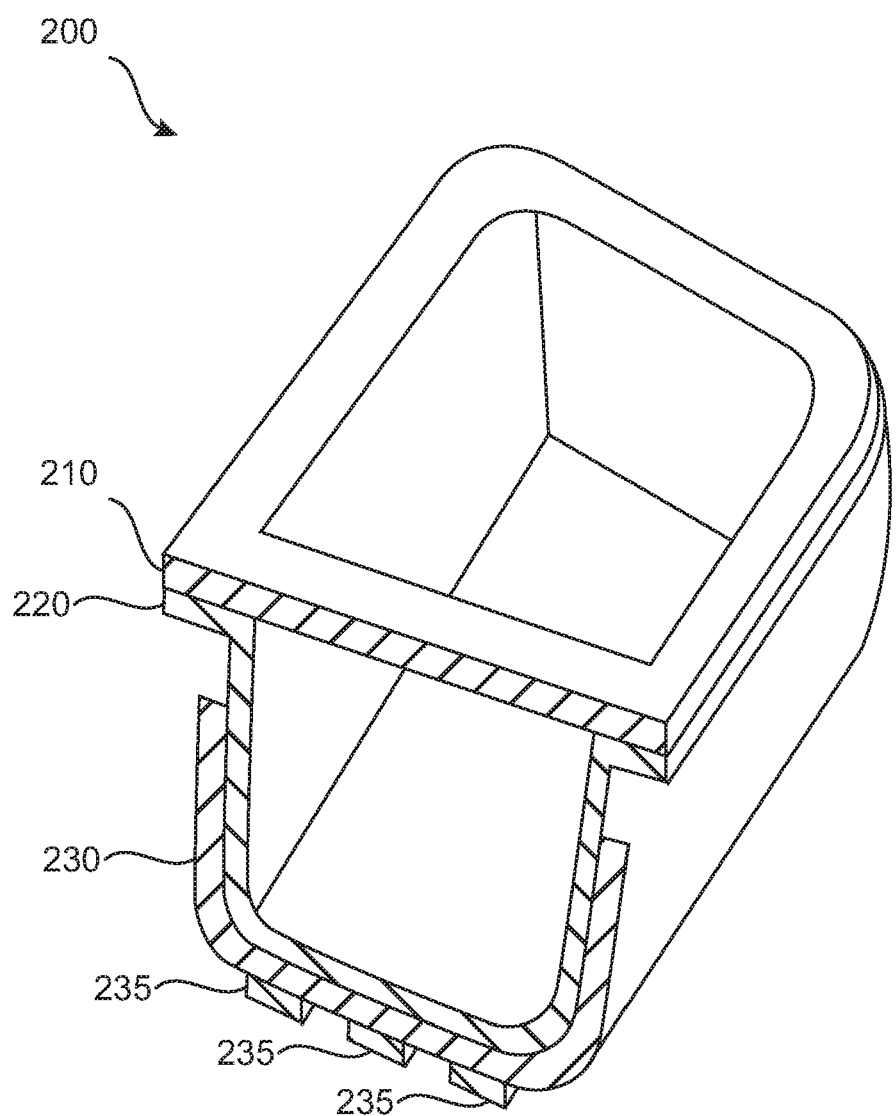
FIG. 2 is a cross-sectional view of a co-molded article.

FIG. 2 illustrates an alternative embodiment of a tank-type article 200 having top 210 associated with tank 220. Tank 220 is at least partially surrounded by case 230 having protuberances 235 extending therefrom. FIG. 2, FIG. 5, FIG. 6, FIG. 12, and FIG. 13, and the accompanying descriptions, explain this alternative embodiment.

Figure 3:
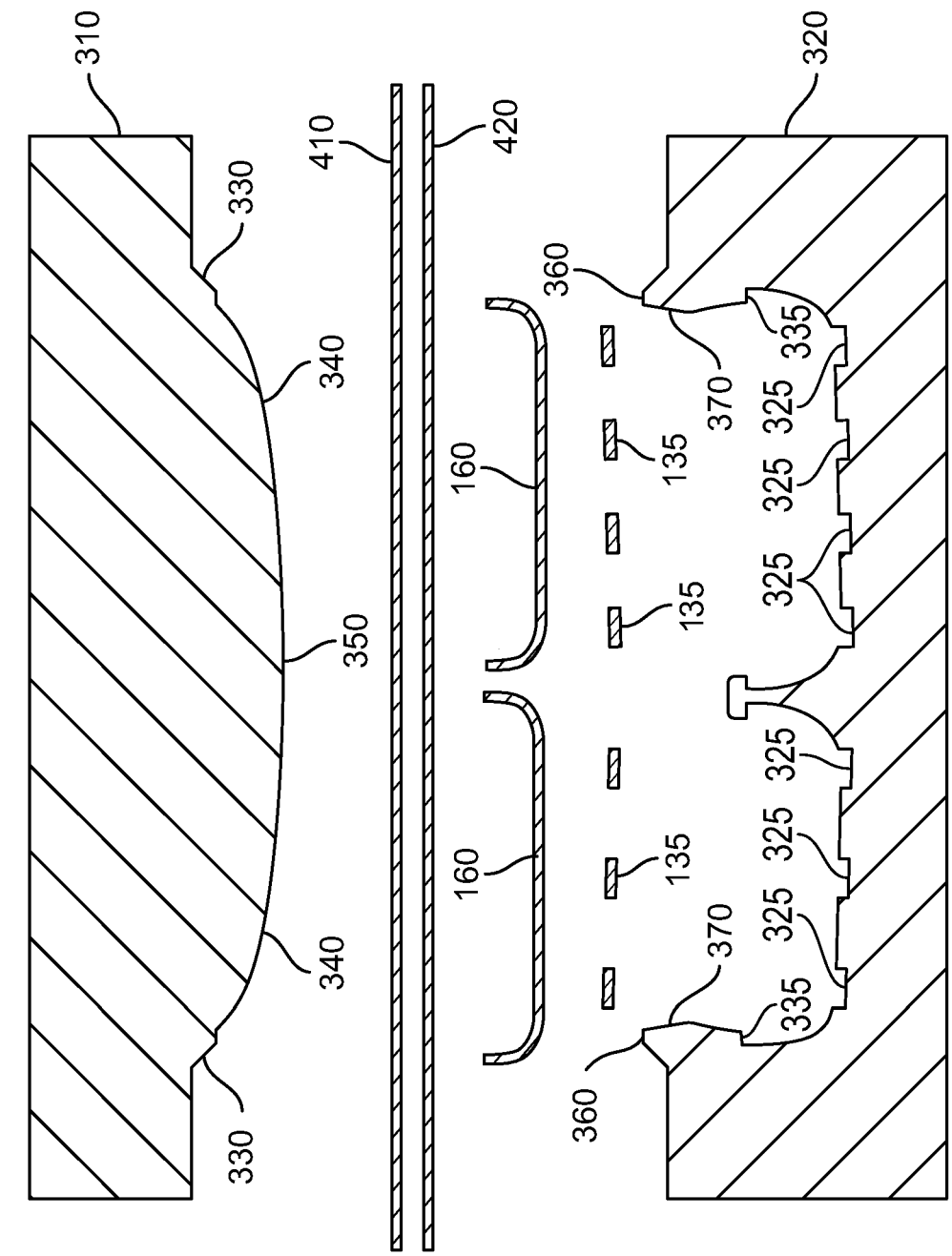
FIG. 3 is a cross-sectional view of an open mold illustrating a relationship of parts for producing an article.
Figure 4:
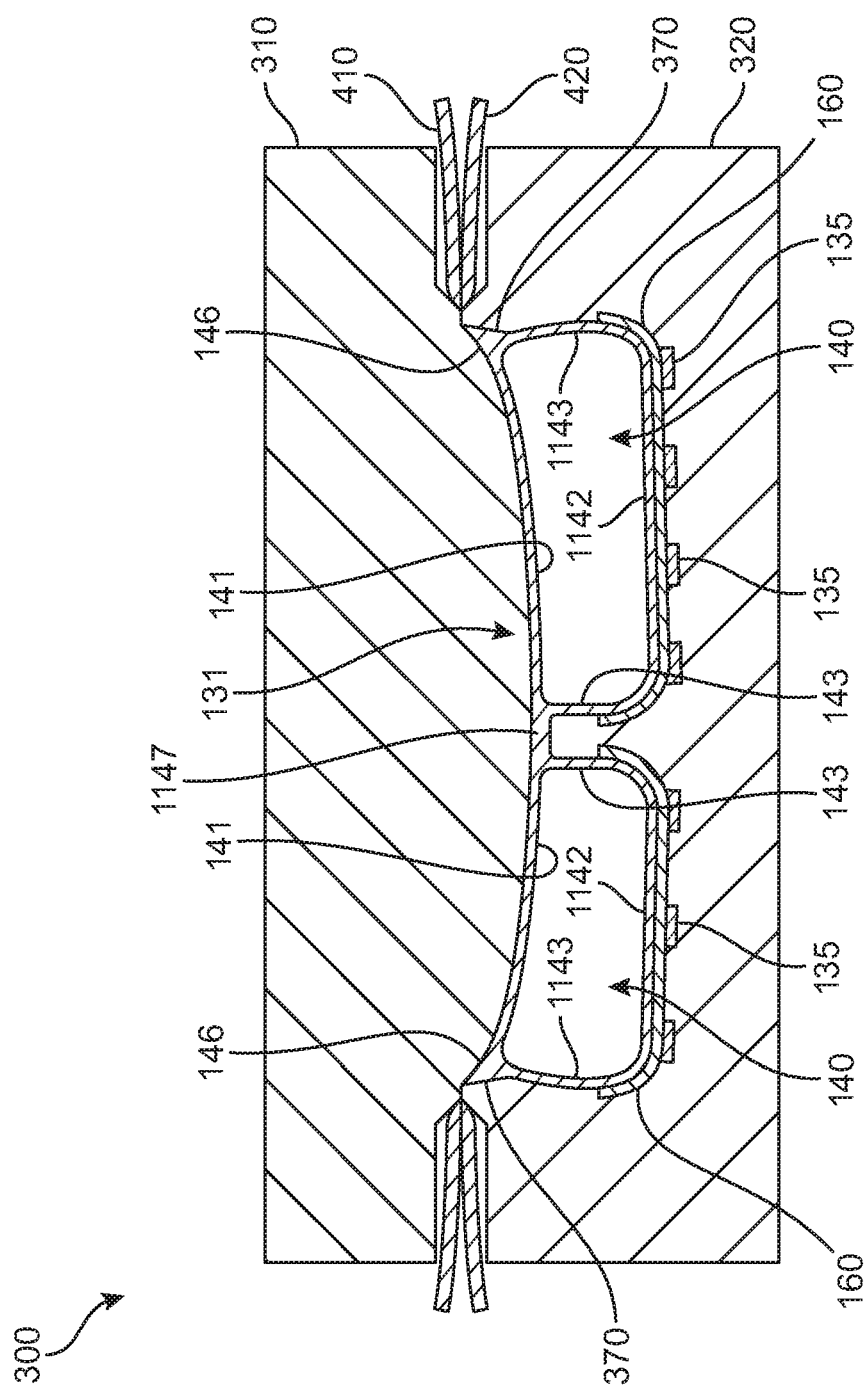
FIG. 4 is a cross-sectional view of a closed mold illustrating a relationship of parts for producing the article of FIG. 3.

FIG. 3 and FIG. 4 illustrate a way of producing a sole structure such as but not limited to sole structure 130 of FIG. 1. FIG. 3 and FIG. 4 depict a cross-section of a mold for co-molding fluid-filled chamber 140 with outsole 160 with protuberances 135 thereon. Outsole 160 may be produced by a number of pre-formed objects or elements assembled in the mold. In some embodiments, outsole 160 wraps at least a portion of edge 143 on fluid-filled chamber 140. Molded structure 131 is an embodiment of an article having outsole 160 wrapping a significant portion of the edge of fluid-filled chamber 140. As the components are produced of thermoplastic materials, they may be softened to aid in producing the shapes in the mold.

FIG. 3 and FIG. 4 are cross-sectional depictions of mold 300 for structure 131. As shown in FIG. 3 and FIG. 4, fluid-filled chamber 140 is co-molded with outsole 160 present in the mold. Adhesive also may be present on appropriate surfaces.

Stated generally, the co-molded article may be produced in a two-piece mold with an upper and a lower mold portion by placing outsole elements into the lower mold portion, then placing the layers that will form the fluid-filled chamber 140 on top of the outsole elements. The mold is then closed so that the upper and lower mold portions abut one another. The mold is shaped so that the closing the mold results in the formation of the chamber. Fluid under pressure is then introduced into the chamber so that the inflation of the chamber forces the upper surface of the chamber into conforming relationship with the underside of the upper mold portion, and also forces the lower portion of the chamber into conforming relationship with the outside elements underneath. Energy may be applied to the mold as heat, radio frequency, or the like to co-mold the first and second elements together with the chamber inflated and pushing the article against the mold surfaces and the outsole elements. The second element portions such as layers of polymer may be provided in the mold as a precursor for the completed product. Such precursor may be formed in the mold as part of the co-molding process as described herein, or may be provided as completely pre-formed chamber that is ready for inflation.

A variety of manufacturing processes may be utilized to produce sole structure 131. In some embodiments, mold 300 that may be utilized in the manufacturing process is depicted as including a first mold portion 310 and a second mold portion 320. Mold 300 is utilized to produce fluid-filled chamber 140 from a first polymer layer 410 and a second polymer layer 420, which are the polymer layers producing fluid-filled chamber upper surface 141 and fluid-filled chamber lower surface 142, respectively. More particularly, mold 300 facilitates the manufacturing process by (a) shaping first polymer layer 410 and second polymer layer 420 in areas corresponding with edges 143 of the fluid-filled chambers 140, flange 146, and conduits between chambers, and (b) joining first polymer layer 410 and second polymer layer 420 in areas corresponding with flange 146 and web area 1147.

Various surfaces or other areas of mold 300 will now be defined for use in discussion of the manufacturing process. First mold portion 310 includes a first mold portion surface 350, which shapes the top surface of the co-molded article. Various parts of a first element, such as outsole 160, and a second element, such as a fluid-filled chamber 140, are illustrated in FIG. 3. Second mold portion 320 is shaped so as to receive protuberances 135 in close engagement with slots 325 in second mold portion 320. Outsole 160 then is placed in the mold. Outsole 160 fits within undercut 335. Then, second element precursor or first polymer layer 410 is put into place to become the top surface of the article and second element precursor or second polymer layer 420 produces the bottom or lower surface 142 of the second element, herein the fluid-filled chamber, when the article is molded.

As first mold portion 310 and second mold portion 320 are moved toward each other, various techniques may be utilized to draw first polymer layer 410 and second polymer layer 420 against surfaces of first mold portion 310 and second mold portion 320, thereby beginning the process of shaping first polymer layer 410 and second polymer layer 420. For example, air may be partially evacuated from the areas between (a) first mold portion 310 and first polymer layer 410 and (b) second mold portion 320 and second polymer layer 420. More particularly, air may be withdrawn through various vacuum ports in first mold portion 310 and second mold portion 320. By removing air, first polymer layer 410 is drawn into contact with the surfaces of first mold portion 310 and second polymer layer 420 is drawn into contact with the surfaces of second mold portion 320. As another example, fluid may be injected into the area between first polymer layer 410 and second polymer layer 420, thereby elevating the pressure between first polymer layer 410 and second polymer layer 420. During a preparatory stage of this process, an injection needle may be located between first polymer layer 410 and second polymer layer 420, and a fluid, such as a gas, a liquid, or a gel, for example, or a blend thereof, then may be ejected from the injection needle such that first polymer layer 410 and second polymer layer 420 engage the surfaces of mold 300. Each of these techniques may be used together or independently.

As first mold portion 310 and second mold portion 320 continue to move toward each other, first polymer layer 410 and second polymer layer 420 are pinched between first mold portion 310 and second mold portion 320. More particularly, first polymer layer 410 and second polymer layer 420 are compressed between pinch surface 330 and pinch edge 360. In addition to beginning the process of separating excess portions of first polymer layer 410 and second polymer layer 420 from portions that form fluid-filled chamber 140, the pinching of first polymer layer 410 and second polymer layer 420 begins the process of bonding or joining first polymer layer 410 and second polymer layer 420 in the area of flange 146.

Following the pinching of first polymer layer 410 and second polymer layer 420, first mold portion 310 and second mold portion 320 proceed with moving toward each other and into a closed configuration, as depicted in FIG. 4. As the mold closes, pinch surface 330 contacts and slides against a portion of second seam-forming surface 370. The contact between pinch surface 330 and second seam-forming surface 370 effectively severs excess portions of first polymer layer 410 and second polymer layer 420 from portions that form fluid-filled chamber 140. The material forming first polymer layer 410 and second polymer layer 420 compacts or otherwise collects to form flange 146. In addition to forming flange 146, first polymer layer 410 and second polymer layer 420 are (a) shaped to produce fluid-filled chamber 140 and (b) compressed and joined to produce web area 1147.

When producing of fluid-filled chamber 140 is complete, mold 300 is opened. Fluid then may be injected into fluid-filled chamber 140 to pressurize forefoot component fluid-filled chambers, thereby completing the manufacture of structure 131. As a final step in the process, structure 131 may be incorporated into a sole structure of an article of footwear 100.

Figure 5:
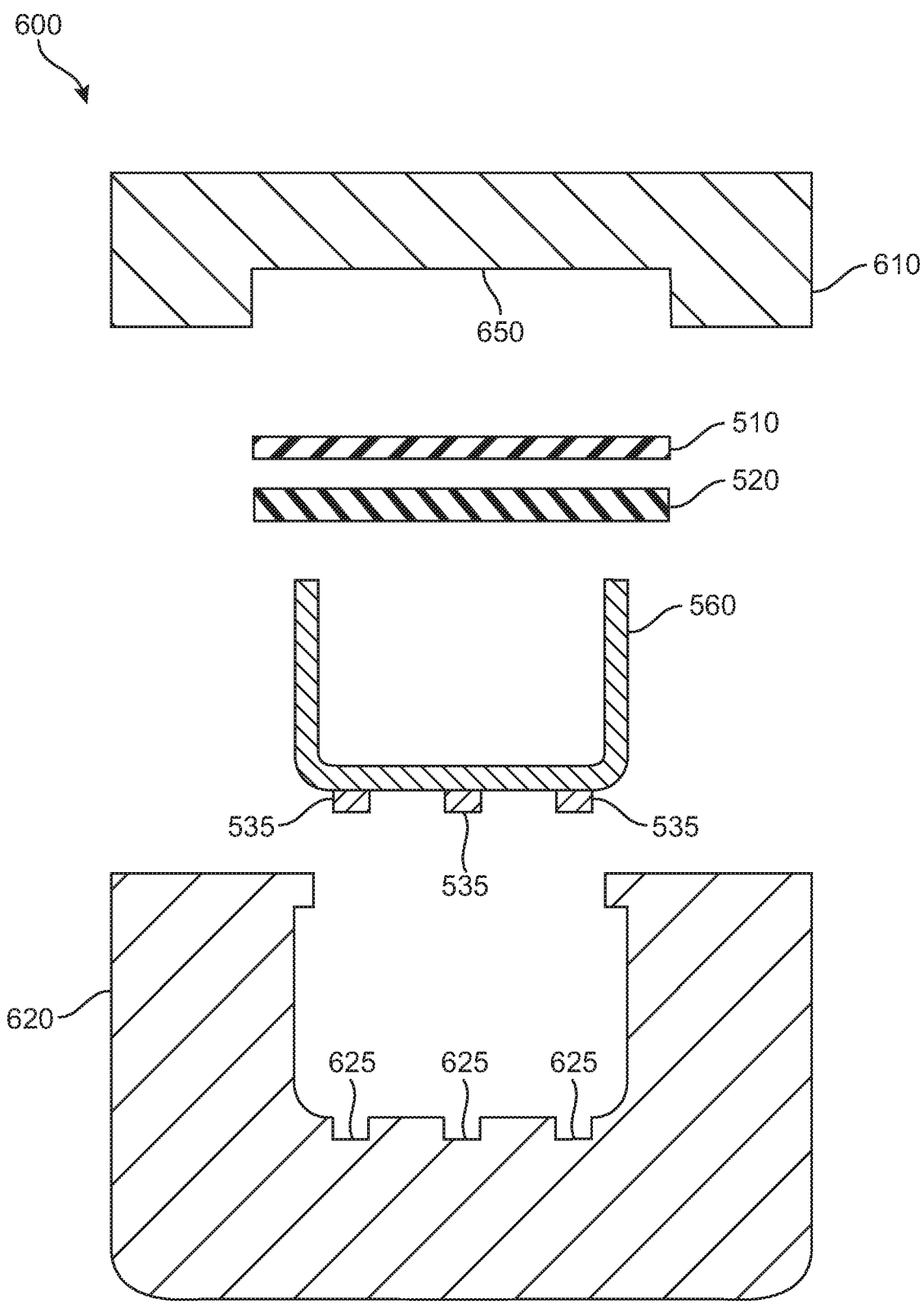
FIG. 5 is a cross-sectional view of an open mold illustrating a relationship of parts for producing an article.

Co-molded articles may have many uses. FIG. 5 illustrates a tank or other container. FIG. 5 depicts molding of a tank or other container. Mold 600 includes first mold portion 610 having mold surface 650. Second mold portion 620 includes slots 625 to securely engage protuberances 535 on first element 560. Second polymer layer 520 and first polymer layer 510 are in position in the open mold. After first element 560 is inserted into the mold, second polymer layer 520 will form the layer of the tank in contact with first element 560. First polymer layer 510 will form the upper surface of the tank.

Figure 6:
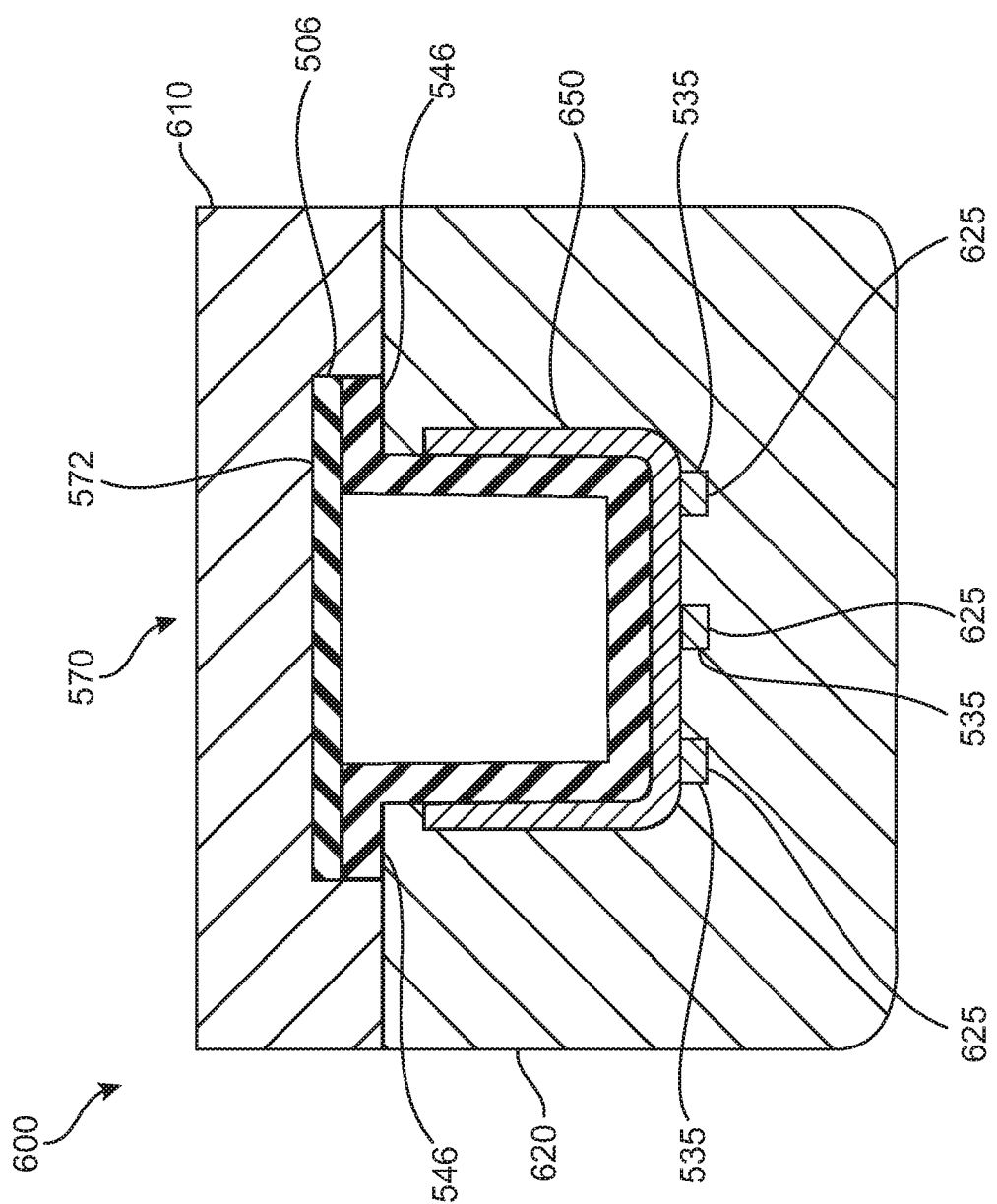
FIG. 6 is a cross-sectional view of a closed mold illustrating a relationship of parts for producing the article of FIG. 5.

FIG. 6 illustrates mold 600 closed to form tank or article 570 within the mold. Surface 650 of first mold portion 610 shapes upper surface 572 of top layer 506 of the article. A sealed tank may be produced by fusing or adhering the polymer layers at flange 546, which may extend around the periphery of the tank. Protuberances 535 on first element 560 fit closely in slots 625 in the second portion 620 of the mold.

Whereas the method and the molds described previously shape parts satisfactorily, the skilled practitioner recognizes that it may be difficult to extract the co-molded article from the mold. So long as the co-molded article is sufficiently flexible and resilient, the article may be deformed slightly to remove it from the undercut mold. However, protuberances formed on the outer surface of a co-molded article in slots and other features that extend the article into the mold may make it very difficult to remove the article from the mold.

Therefore, this disclosure is directed to co-molding articles in a mold that minimizes contact between protuberances on the article and surfaces of the mold. The co-molded article may include a pre-formed article. In some embodiments, the pre-formed article is capable of essentially retaining its shape. In such embodiments, a first element may be a pre-formed element placed in a mold wherein the interior surface is essentially uninterrupted by slots and other features in which protuberances may be formed. Rather, in such embodiments, the first element is placed in the mold with minimal interference or contact between the protuberances and the mold. The element essentially retains its shape when placed in the mold. In some embodiments, a base or end surface of a protuberance may contact the surface of the mold, but the sides of the protuberances are essentially free of contact with the mold. In this way, the co-molded article may be easily removed from the mold.

Figure 7:
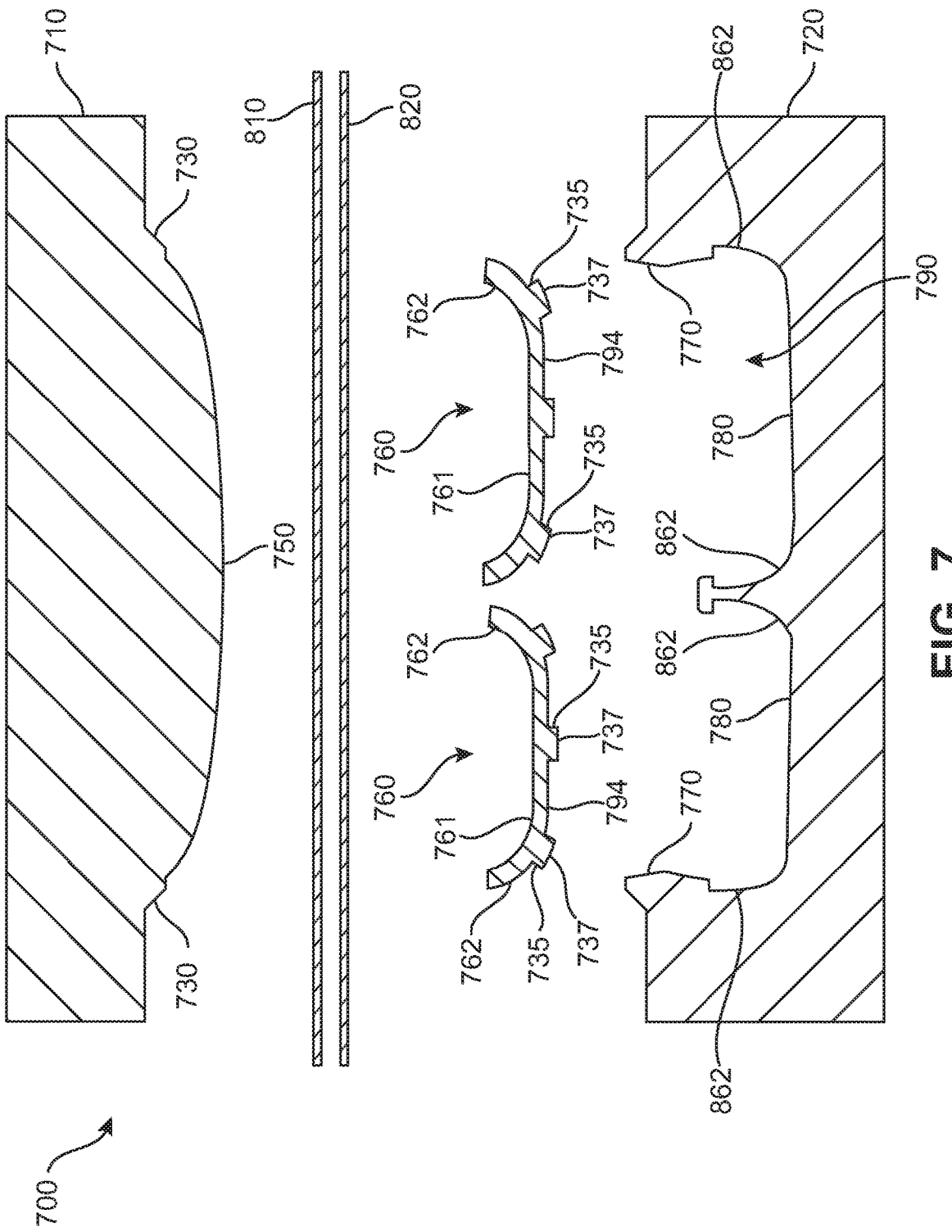
FIG. 7 is a cross-sectional view of an open mold illustrating a relationship of parts for producing an article of the disclosure.
Figure 8:
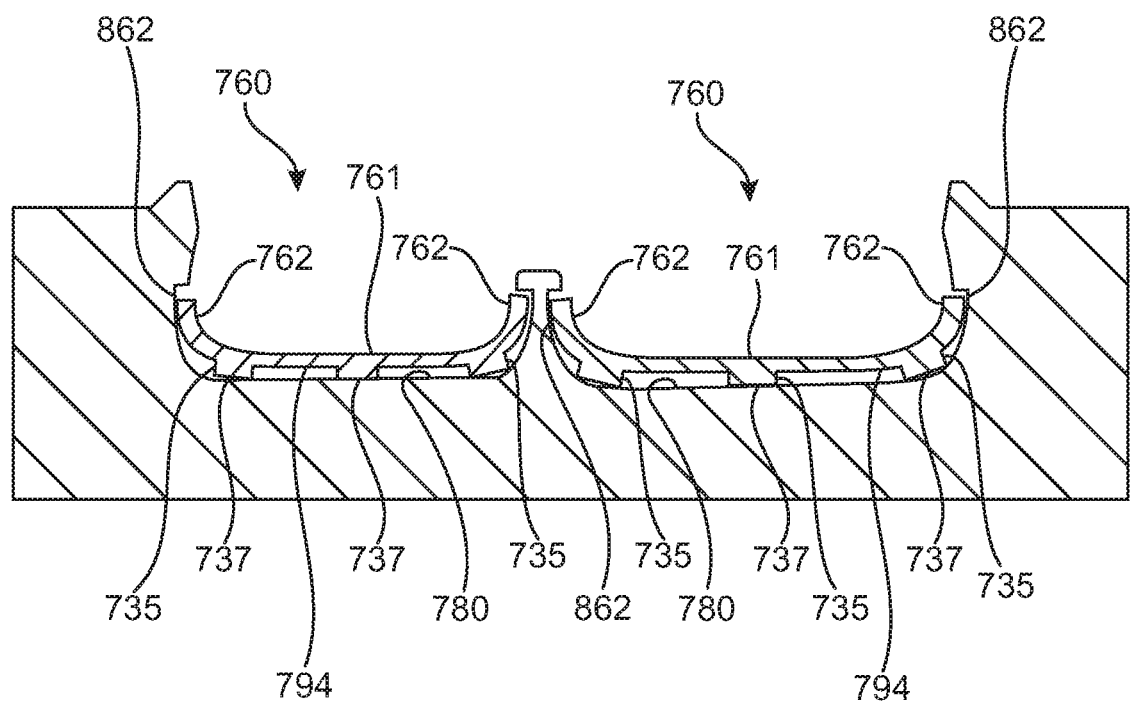
FIG. 8 is a cross-sectional view of one part of an open mold illustrating a relationship of parts for producing the article of FIG. 7.
Figure 9:
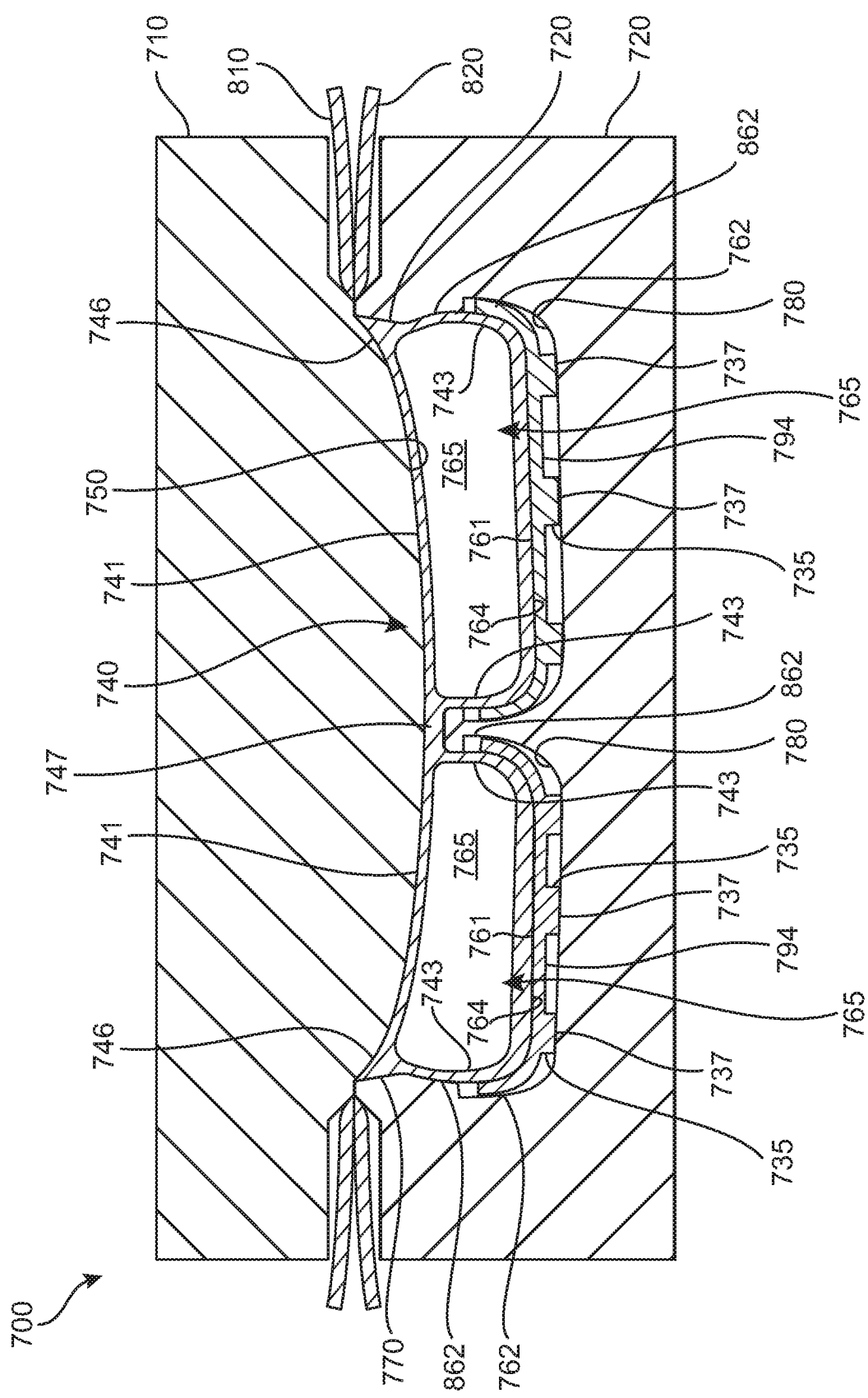
FIG. 9 is a cross-sectional view of a closed mold illustrating a relationship of parts for producing the article of FIG. 7.

In some embodiments, a sole structure for an article of footwear may be made in accordance with a method for co-molding a first element and a second element to produce a co-molded article. FIG. 7, FIG. 8, and FIG. 9 depict stages of this method for co-molding a sole structure of an article of footwear. Mold 700 may have a first mold portion 710 and a second mold portion 720. Shape 750 on first mold portion 710 may form the top surface 741 of the co-molded article.

The first element 760 may have top surface 761, edge surface 762, and protuberance 735 having base 737 opposite top surface 761. Edge surface 762 may extend any distance away from top surface 761. First element 760 also may have bottom surface 794. The second element 765 may have edge 743, upper surface 741, and lower surface 764.

Any suitable polymeric material may be used to produce the first element, which would be an outsole as depicted in FIG. 7. Although each feature is illustrated in the figures as a single layer, each such feature may comprise a single layer of material or multiple layers, and may be thermoformed or otherwise shaped. Examples of polymeric materials that may be utilized for such a sole structure include any of polyurethane, urethane, polyester, polyester polyurethane, polyether, polyether polyurethane, latex, polycaprolactone, polyoxypropylene, polycarbonate macroglycol, and blends thereof. These and other polymeric materials, an exemplary embodiment, and a method for manufacturing them, may be found in U.S. Pat. No. 9,420,848 to Campos II et al., the entirety of which is hereby incorporated by reference.

An outsole typically may be produced from any durable material. Typically, outsole material is tough, durable, resistant to abrasion and wear, flexible, and skid-resistant. In some embodiments, polyurethane materials sufficiently durable for ground contact. Suitable thermoplastic polyurethane elastomer materials include Bayer Texin® 285, available from Bayer. Elastollan® SP9339, Elastollan® SP9324, and Elastollan® C705, available from BASF, also are suitable. Polyurethane and other polymers that may not be sufficiently durable for direct ground contact may be used to produce part of an outsole in some embodiments. In such embodiments, a rubber outsole may be adhered or cemented onto the outsole. In embodiments, the outsole material is transparent or translucent. In embodiments, ground-engaging lugs may be integrally produced as part of an outsole, or may be separately produced and adhered to the outsole. The outsole may have a textured ground-engaging surface to improve traction.

As depicted in FIG. 7, FIG. 8, and FIG. 9, first element 760 may be an outsole. For such an embodiment, in accordance with the method, outsole 760 is located in second mold portion 720 with base 737 of protuberance 735 in contact with surface 780 of second mold portion 720. Surface 780 of second mold portion 720 is shaped so as to not contact a significant fraction of protuberance 735 other than base 737. Protuberance 735 may be considered to be a ground-engaging portion, with an end thereof being a base 737 that engages the ground. As depicted with particularity in FIG. 7 and FIG. 8, outsole 760 may have a slight arc or curve that cause edge 762 to not contact edge 862 of second mold portion 720. Not all bases 737 may touch surface 780 simultaneously before molding with a second element.

Precursor for a second element, a fluid-filled chamber, is placed in the mold and the mold is closed. First polymer layer 810 may form top surface 741 of second element 765. Second polymer layer 820 may form edge 743 of second element 765 and lower surface or bottom 764 of second element or fluid-filled chamber 765.

Each of first polymer layer 810 and second polymer layer 820 are initially located between first mold portion 710 and second mold portion 720, which are in a spaced or open configuration, as depicted in FIG. 7. In this position, first polymer layer 810 is positioned adjacent or closer to first mold portion 710, and second polymer layer 820 is positioned adjacent or closer to second mold portion 720. A shuttle frame or other device may be utilized to properly position first polymer layer 810 and second polymer layer 820. As part of the manufacturing process, one or both of first polymer layer 810 and second polymer layer 820 are heated to a temperature that facilitates shaping and bonding. As an example, various radiant heaters or other devices may be utilized to heat first polymer layer 810 and second polymer layer 820, possibly prior to being located between first mold portion 710 and second mold portion 720. As another example, mold 700 may be heated such that contact between mold 700 and first polymer layer 810 and second polymer layer 820 at a later portion of the manufacturing process raises the temperature to a level that facilitates shaping and bonding.

Once first polymer layer 810 and second polymer layer 820 are properly positioned, first mold portion 710 and second mold portion 720 translate or otherwise move toward each other and begin to close on first polymer layer 810 and second polymer layer 820. Fluid under pressure may be introduced into fluid-filled chamber 765 to conform upper surface 741 of fluid-filled chamber 765 to the shape 750 of the first mold portion 710, to conform lower surface 764 of fluid-filled chamber or second element 765 to the shape of top surface 761 of first element 760, and to conform edge 743 of fluid-filled chamber 765 to edge surface 762 of first element 760 or edge 862 of second mold portion 720.

Upon injection of fluid into fluid-filled chamber 765, second polymer layer 820 may be urged toward top surface 761 of outsole 760, edge 762 of outsole 760, and edge 862 of second mold portion 720. As the pressure in fluid-filled chamber 765 increases, pressure on outsole top surface 761 may urge bases 737 on protuberances 735 toward surface 780 of second mold portion 720. Similarly, pressure in fluid-filled chamber 765 may urge edge 743 of fluid-filled chamber 765 toward edge 762 of outsole 760, and may urge both toward edge 862 of second mold portion. Edge 743 also may be urged into contact with edge 862 of second mold portion 720 where edge 762 of outsole 760 does not preclude contact therewith.

As can be seen with particularity in FIG. 8 and FIG. 9, bottom surface 794 of outsole 760 typically may not contact bottom surface 780 of second mold portion 720 even after the fluid-filled chamber is fully molded. Although outsole 760 is held in position, demolding is carried out with less force than demolding from a mold that exerts forces on such protuberances, such as in FIG. 3 and FIG. 4. Fluid pressure in fluid-filled chamber 765 may be adjusted after the sole structure is demolded.

Figure 10:
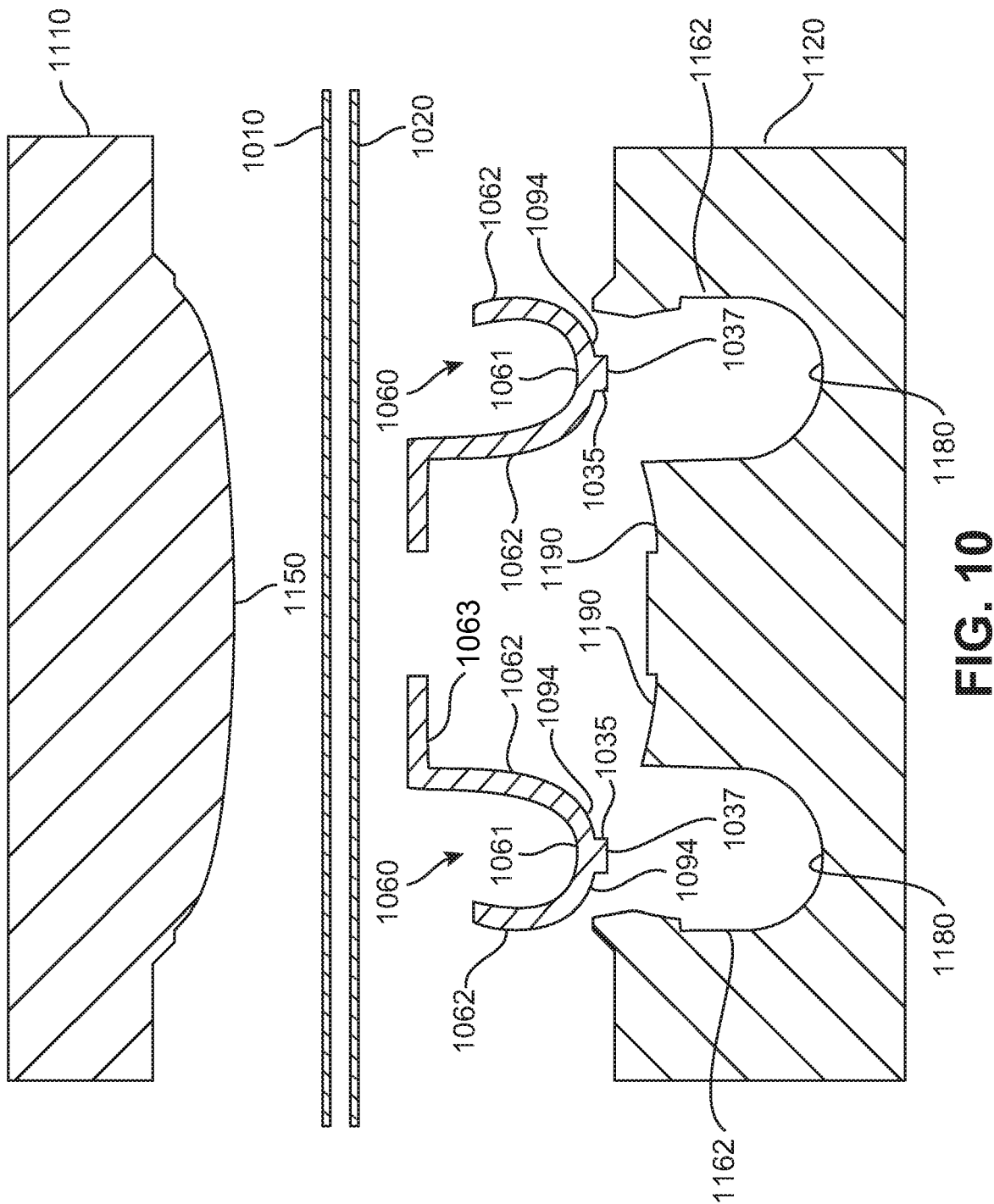
FIG. 10 is a cross-sectional view of an open mold illustrating a relationship of parts for producing another article of the disclosure.
Figure 11:
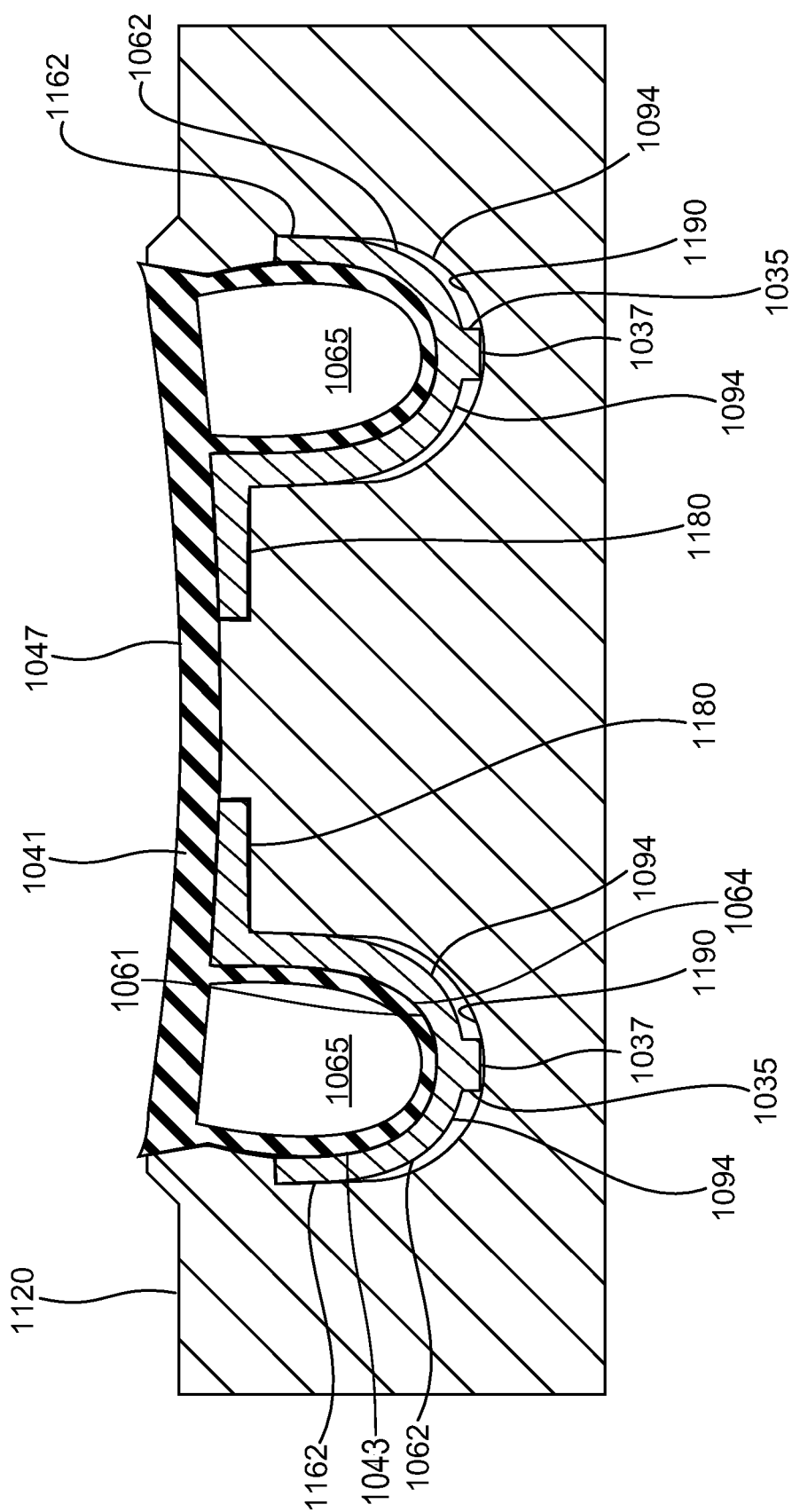
FIG. 11 is a cross-sectional view of a closed mold illustrating a relationship of parts for producing the article of FIG. 10.

FIG. 10 and FIG. 11 illustrate another embodiment of a co-molded article in the produce of a sole structure for an article of footwear that may be made in accordance with a method for co-molding a first element and a second element to produce a co-molded article. Mold 1100 may have a first mold portion 1110 and a second mold portion 1120. Shape 1150 on first mold portion 1110 may produce the top surface 1041 of the co-molded article.

Outsole 1060 may have top surface 1061, edge surface 1062, and protuberance 1035 having base 1037 opposite top surface 1061. The second element 1065 may have edge 1043, upper surface 1041, and lower surface 1064. Any suitable polymeric material may be used to produce the sole structure, as described with regard to FIG. 7, FIG. 8, and FIG. 9.

In some embodiments, such as in the embodiments depicted in FIG. 10 and FIG. 11, first element 1060 may be an outsole. For such an embodiment, in accordance with the method, outsole 1060 is located in second mold portion 1120 with base 1037 of protuberance 1035 in contact with surface 1180 of second mold portion 1120. Surface 1180 of second mold portion 1120 is shaped so as to not contact a significant fraction of protuberance 1035 other than base 1037. Protuberance 1035 may be a ground-engaging portion, with the end thereof being a base 1037 that engages the ground. As depicted with particularity in FIG. 10, outsole 1060 may have a slight arc or curve that cause edge 1062 to not contact edge 1162 of second mold portion 1120. Outsole 1060 may include flange 1063, which may provide additional support to the sole structure.

Precursor for a second element, a fluid-filled chamber, is placed in the mold and the mold is closed. First polymer layer 1010 may produce top surface 1041 of second element 1065. Second polymer layer 1020 may form edge 1043 and lower surface or bottom 1064 of second element or fluid-filled chamber 1065.

Each of first polymer layer 1010 and second polymer layer 1020 are initially located between each of first mold portion 1110 and second mold portion 1120, which are in a spaced or open configuration, as depicted in FIG. 10 and FIG. 11. The polymer layers are placed and heated as described in relationship to FIG. 7, FIG. 8, and FIG. 9.

Fluid under pressure may be introduced into fluid-filled chamber 1065 as it forms to conform upper surface 1041 of fluid-filled chamber 1065 to the shape 1150 of the first mold portion, to conform lower surface 1064 of fluid-filled chamber or second element 1065 to the shape of top surface 1061 of first element or outsole 1060, and to conform edge 1043 of fluid-filled chamber 1065 to edge surface 1062 of outsole 1060 or edge 1162 of second mold portion 1120.

Upon injection of fluid into fluid-filled chamber 1065, second polymer layer 1020 may be urged toward top surface 1061 of outsole 1060, edge 1062 of outsole 1060, and edge 1162 of second mold portion 1120. As the pressure in fluid-filled chamber 1165 increases, pressure on outsole top surface 1061 may urge bases 1037 on protuberances 1035 toward surface 1080 of second mold portion 1120. Similarly, pressure in fluid-filled chamber 1065 may urge edge 1043 of fluid-filled chamber 1065 toward edge 1062 of outsole 1060, and may urge both toward edge 1162 of second mold portion. Edge 1043 also may be urged into contact with edge 1162 of second mold portion 1120 where edge 1062 of outsole 1060 does not preclude contact therewith.

As can be seen with particularity in FIG. 11, bottom surface 1094 of outsole 1060 typically may not contact bottom surface 1180 of second mold portion 1120 even after the fluid-filled chamber is fully molded. Although outsole 1060 is held in position during molding, demolding is carried out with less force than demolding from a mold that exerts forces on such protuberances. Fluid pressure in fluid-filled chamber 1065 may be adjusted after the sole structure is demolded. Fluid pressure in fluid-filled chamber 1065 may be adjusted after the sole structure is demolded.

Embodiments of the disclosure may be molded from any moldable sheet material, such as thermoplastic polymer. Embodiments also may have any function, and may have any shape that can be molded. Embodiments accommodate pressurization of the mold after the bottom layer of the object is inserted into the mold so that the pressure will urge the layer to contact the fixed object, the edges of the fixed object or of the mold, and urge the fixed object toward the mold.

Figure 12:
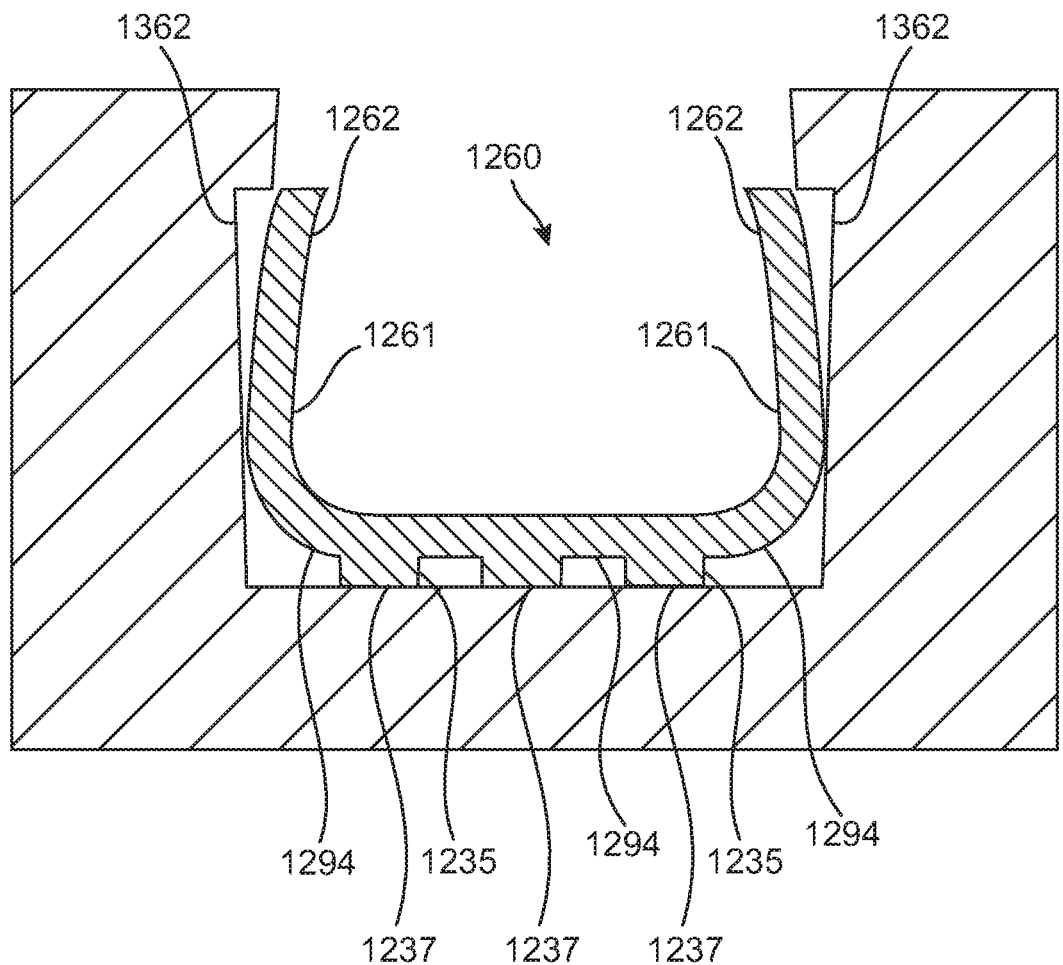
FIG. 12 is a cross-sectional view of an open mold illustrating a relationship of parts for producing still another article of the disclosure.
Figure 13:
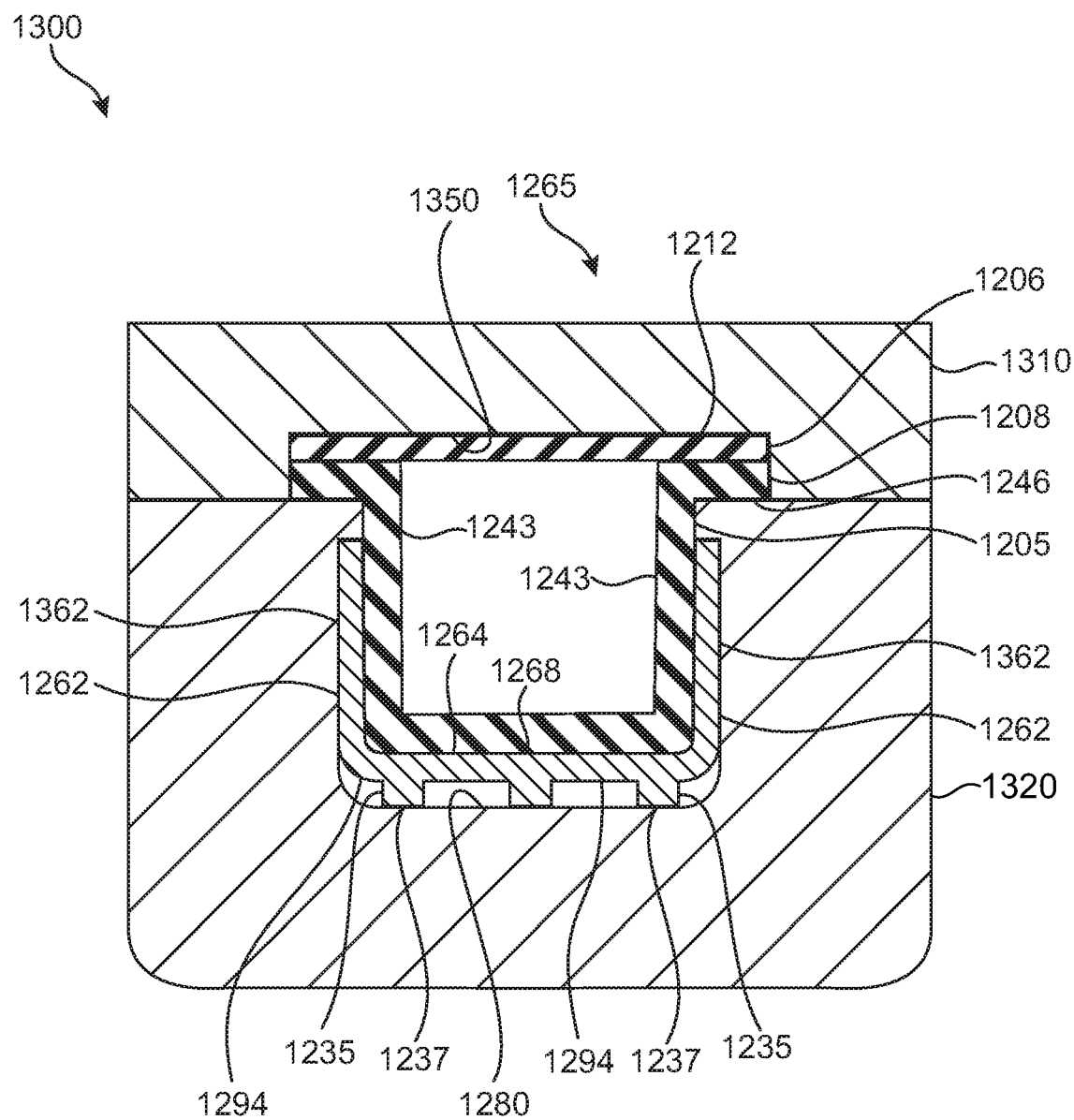
FIG. 13 is a cross-sectional view of a closed mold illustrating a relationship of parts for producing the article of FIG. 12.

In some embodiments, the shape of the co-molded article may produce a container. FIG. 12 and FIG. 13 depict a container having feet. The container may be first element 1260, which may be characterized as case 1260. As depicted in FIG. 12, first element or case 1260 has been placed in second mold portion 1320. Case 1260 may have a foot or protuberance 1235, with the foot having a bottom 1237. Second mold portion 1320 may include bottom surface 1280. In some embodiments, bottom surface 1280 may not contact each bottom 1237 of feet 1235. Case 1260 may have a shape that includes a slight arc. Thus, whether each bottom 1237 of feet 1235 touches bottom surface 1280 depends upon the arrangement of feet 1235 and whether case 1260 may have an arc when placed in second mold portion 1320. In such embodiments, an arc may be exhibited in object edge 1262. As depicted in FIG. 12, object edge 1262 illustrates such an arc, as object edge 1262 is not in contact with mold edge 1362.

Placement of first and second polymer webs between first mold portion 1310 and second mold portion 1320 in mold 1300 before closing the mold, as depicted in FIG. 13, is carried out in essentially the same manner as is the method described with regard to FIG. 7, FIG. 8, and FIG. 9.

In some embodiments, box top 1206, produced from a first polymer layer, may be adhered or otherwise affixed to a second polymer layer 1208 that forms the remainder of the box at flange 1246. The top surface of box top 1206 is shaped by surface 1350 to form box surface 1212.

Fluid may be injected into the volume formed by second polymer layer 1208 and box top 1206. The fluid may be a gas, a liquid, or a gel. Injection of fluid into box 1265 may urge second polymer layer 1208 toward top surface 1246 of case 1260, edge 1262 of case 1260, and edge 1362 of second mold portion 1320. As the pressure in box 1265 increases, pressure on first element bottom surface 1264 may urge bases 1237 on protuberances 1235 toward surface 1280 of second mold portion 1320. Similarly, pressure in case 1260 may urge edge 1243 of second polymer layer toward edge 1262 of case 1260, and may urge both toward edge 1362 of second mold portion 1320. Edge 1243 also may be urged into contact with edge 1362 of second mold portion 1320 where edge 1262 of case 1260 does not preclude contact therewith.

As can be seen with particularity in FIG. 13, bottom surface 1294 of case 1260 typically may not contact bottom surface 1390 of second mold portion 1320 even after the case is fully molded. Although case 1260 is held in position, demolding is carried out with less force than demolding from a mold that exerts forces on such protuberances 1235. Fluid pressure in box 1265 may be adjusted after the co-molded article is demolded.

Embodiments include articles made in accordance with the method disclosed herein. Embodiments of these articles may be a sole structure for an article of footwear, as described herein. Such a sole structure may be attached to an upper for an article of footwear to produce an article of footwear. The upper for an article of footwear may be any suitable composition of material element. Such material elements may include textiles, foams, leathers, and synthetic leathers, for example. More than one material may be present in an upper. The sole structure may be affixed to the upper by adhesion, sewing, or stitching, or by any method known to the skilled practitioner.

Figure 14:
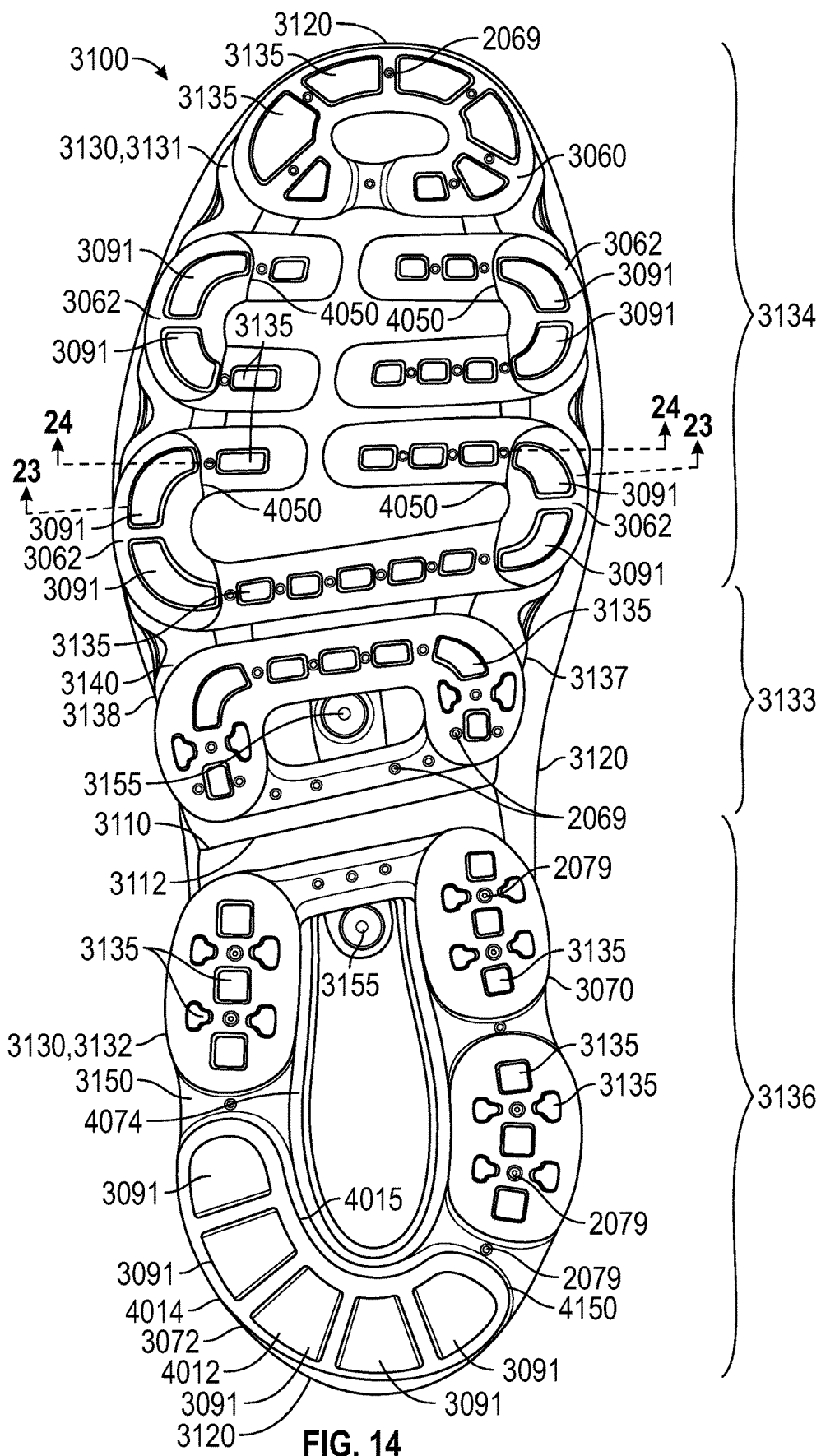
FIG. 14 is a bottom view of a sole structure for an article of footwear including a forefoot sole structure and a heel sole structure attached to a footwear upper.
Figure 15:
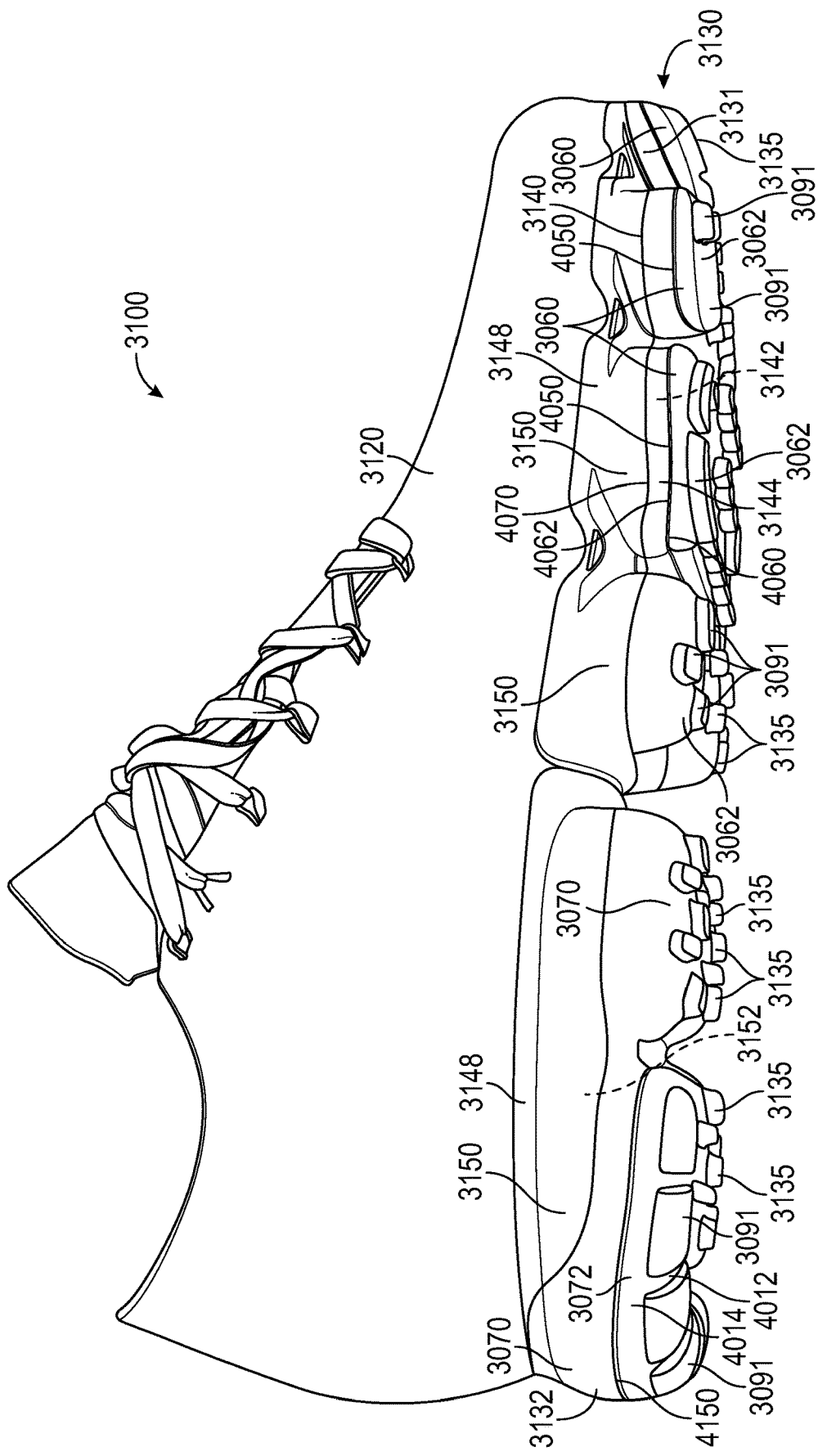
FIG. 15 is a lateral side view of an article of footwear including the sole structure of FIG. 14 attached to a footwear upper.

FIG. 14 illustrates an article of footwear 3100 having a sole structure 3130, which is secured to the outer periphery of an upper 3120, also shown in FIG. 15, or upper 120 of FIG. 1. The sole structure 3130 may be secured to a bottom surface of the upper 3120, or a strobel, lasting board, or foam layer may be secured to the upper 3120 and the sole structure 3130 may secure to the bottom surface of the strobel, lasting board, or foam layer. Sole structure 3130 is located under the foot and supports the foot. The primary elements of sole structure 3130 are a forefoot sole structure 3131 and a heel sole structure 3132. The sole structure 3130 has a forefoot region 3134, a midfoot region 3133, and a heel region 3136 and extends from a medial side 3137 to a lateral side 3138.

Figure 16:
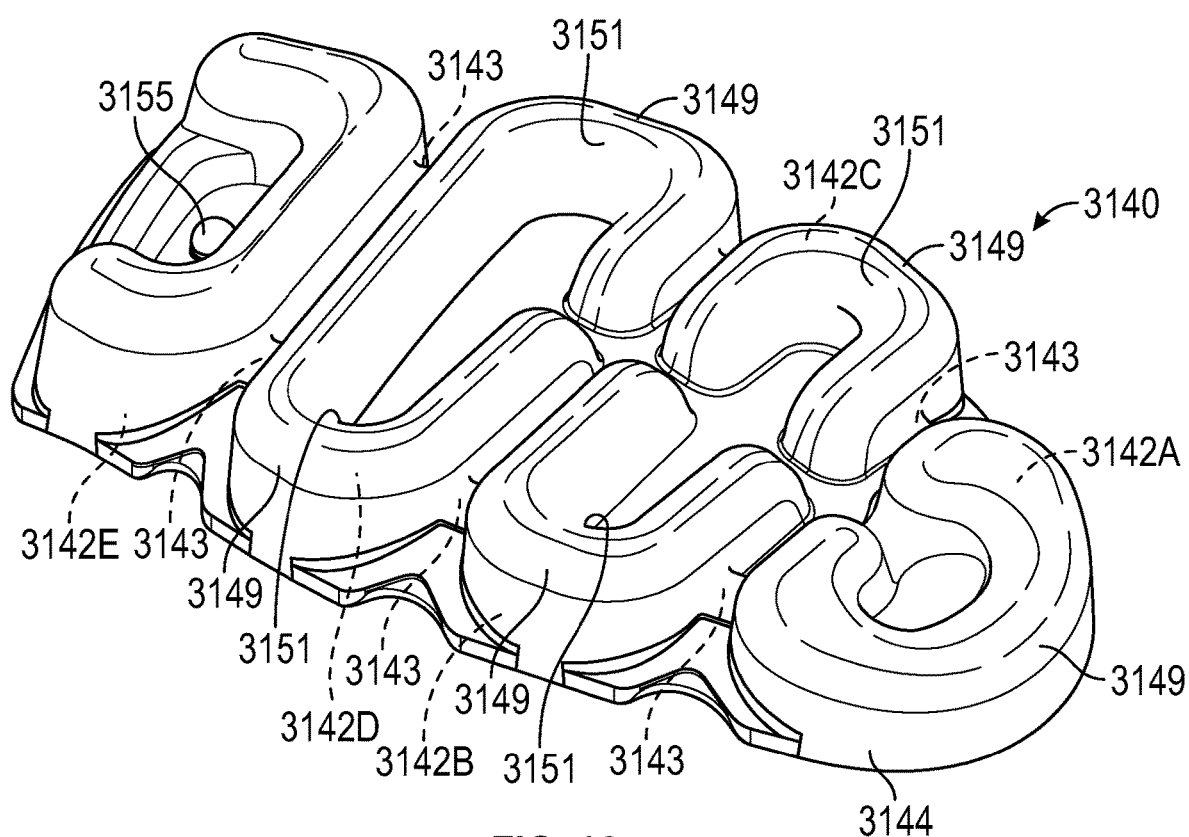
FIG. 16 is a perspective view of a lower surface of a forefoot bladder element of the sole structure of FIG. 14.
Figure 20:
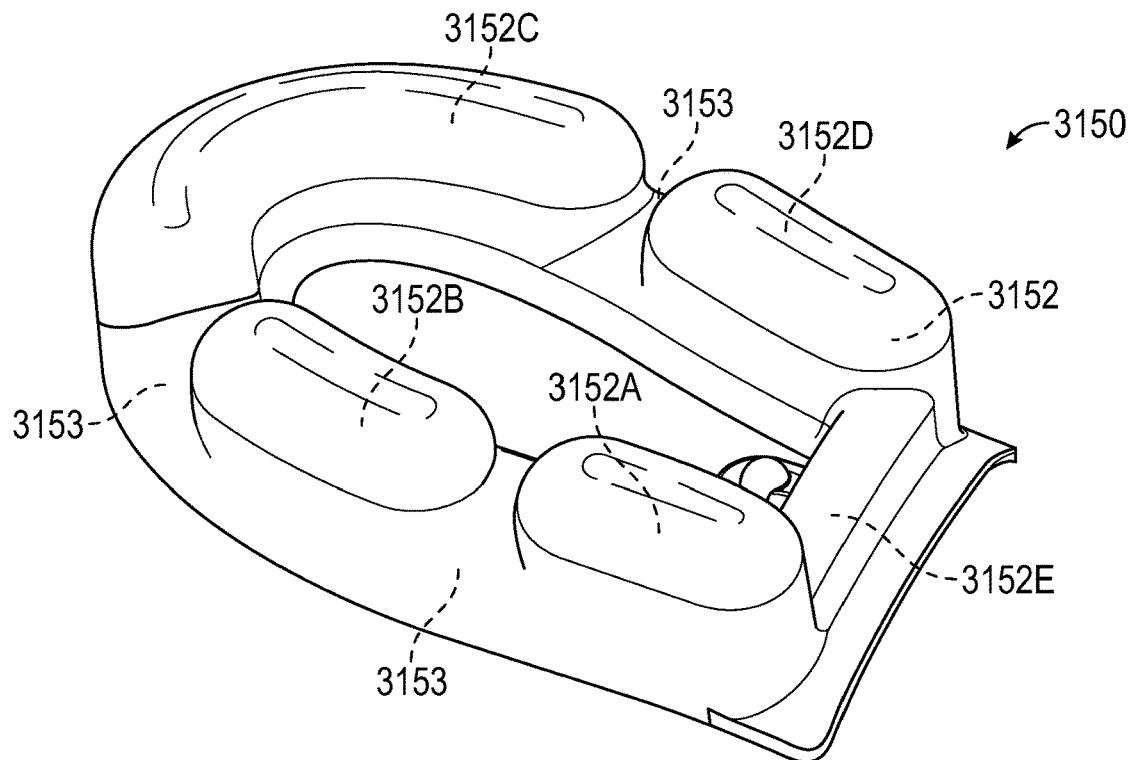
FIG. 20 is a perspective view of a lower surface of a heel bladder element of the sole structure of FIG. 14.

The forefoot sole structure 3131 includes a forefoot midsole, which, in the embodiment shown, is a polymeric bladder element 3140, and is also referred to as a forefoot component, forefoot bladder element, or a fluid-filled chamber. The polymeric bladder element 3140 is best shown in FIG. 16. The polymeric bladder element 3150 is best shown in FIG. 20. The bladder element 3140 encloses a fluid-filled interior cavity 3142 indicated in FIGS. 15 and 16. Similarly, the heel sole structure 3132 includes a heel midsole, which, in the embodiment shown, is a polymeric bladder element 3150, and is also referred to as a heel component, heel bladder element, or a fluid-filled chamber. The bladder element 3150 encloses a fluid-filled interior cavity 3152 indicated in FIGS. 15 and 20. The bladder elements 3140, 3150 are between the outsole components of the bottom view of FIG. 14 and the upper 3120, as best shown in FIG. 15.

The bladder elements 3140 and 3150 are separate from one another and are not in fluid communication with one another. The bladder element 3140 has multiple tubular portions with arcuate shapes (e.g., generally U shaped) so that the fluid-filled interior cavity 3142 has corresponding tubular portions 3142A, 3142B, 3142C, 3142D, and 3142E interconnected and in fluid communication with one another by channels 3143 as best shown in FIG. 16. The bladder element 3150 has multiple interconnected portions arranged in a U-shape so that the fluid-filled interior cavity 3152 has multiple portions 3152A, 3152B, 3152C, 3152D and 3152E interconnected and in fluid communication with one another by channels 3153, as best shown in FIG. 20. The polymeric bladder element 3140 is configured so that arcuate portions of the fluid-filled interior cavity 3142 are at an outer periphery in the forefoot region 3134 of the sole structure 3131 as shown in FIG. 15. The bladder element 3140 has arcuate tubular portions 3149 in the forefoot region of the sole structure, as best shown in FIG. 16. The arcuate tubular portions 3149 have inner curved walls 3151 with tighter curvature than the outer walls of the arcuate tubular portions 3149. Stated differently, the inner curved walls 3151 are at the inside of the U-shaped arcuate tubular portions 3149. The side surface 3079 of the bladder element 3140 to which the first wall of the first outsole component is secured is at the inner curved wall 3151. The inner wall 3099 can thus support and reinforce both the second wall 3087 and the inner curved wall 3151 of the bladder element 3140 at the arcuate tubular portion during flexing of the forefoot region. This support and reinforcement should reduce stresses on the second wall 3087 to prevent cracking of the second wall 3087.

Figure 24:
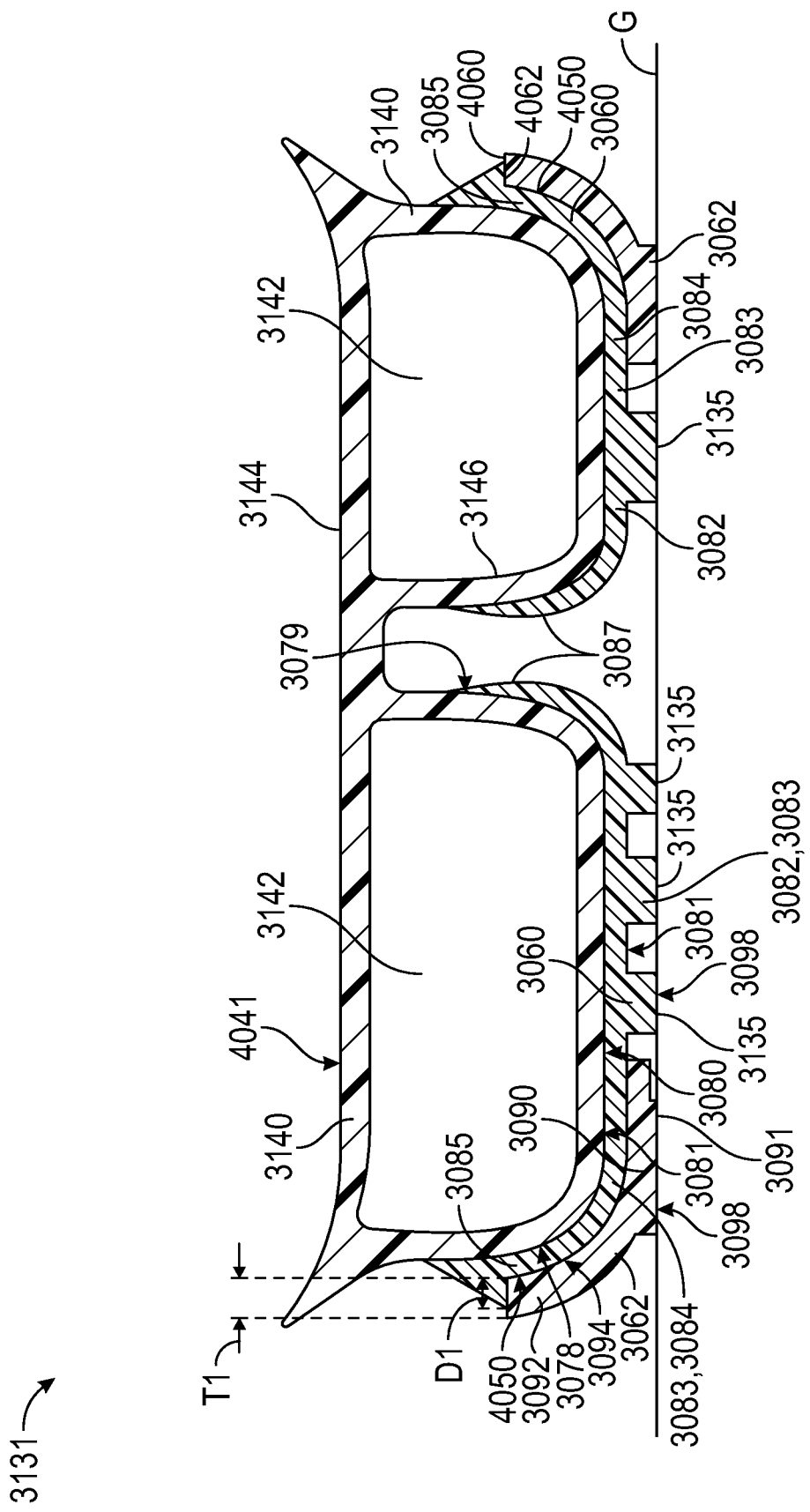
FIG. 24 is a cross-sectional view of the sole structure of FIG. 14 taken at lines 24-24 in FIG. 14.
Figure 27:
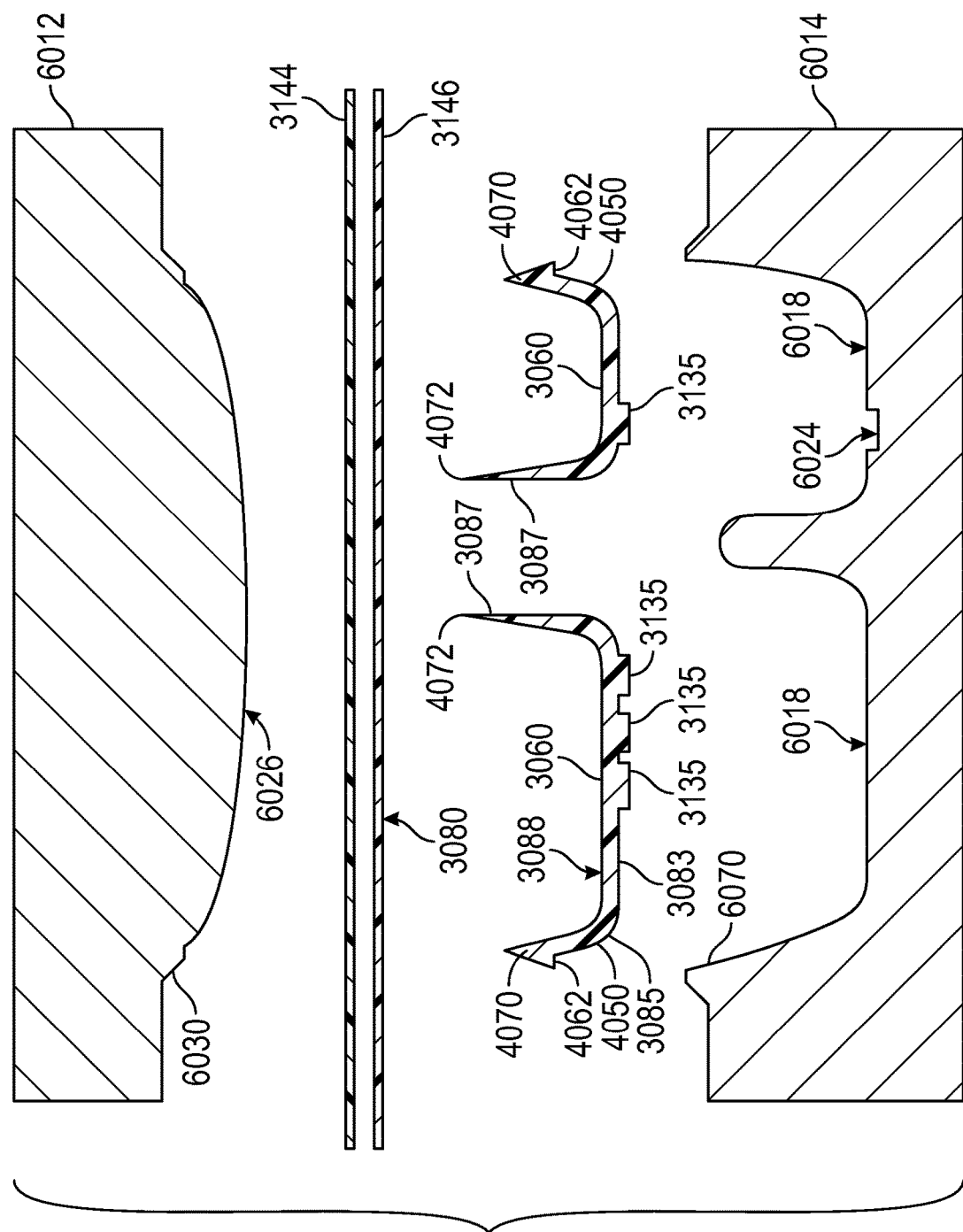
FIG. 27 is a cross-sectional and exploded view of an open thermoforming mold illustrating a relationship of some of the components of the sole structure of FIG. 14.

The bladder elements 3140, 3150 may each be thermoformed from upper and lower sheets 3144, 3146 as shown in FIGS. 24 and 27 and described herein (also referred to as first and second sheets, first and second layers, or upper and lower layers), or, in the alternative, may be blow-molded. The sheets may have alternating layers of TPU and a gas barrier material. In any embodiment, each bladder element 3140, 3150 is configured to retain fluid within the fluid-filled interior cavities 3142, 3152. As used herein, a "fluid" includes a gas, including air, an inert gas such as nitrogen, or another gas. Accordingly, "fluid-filled" includes "gas-filled". The various materials used for the bladder elements 3140, 3150 may be substantially transparent or may have a tinted color. For example, the bladder elements 3140, 3150 can be formed from any of various polymeric materials that can retain a fluid at a predetermined pressure, including a fluid that is a gas, such as air, nitrogen, or another gas. For example, the bladder elements 3140, 3150 can be a thermoplastic urethane (TPU) material, a urethane, polyurethane, polyester, polyester polyurethane, and/or polyether polyurethane.

Moreover, in one embodiment, the bladder elements 3140, 3150 can be formed of one or more sheets having layers of different materials. The sheets may be laminate membranes formed from thin films having one or more first layers that comprise thermoplastic polyurethane layers and that alternate with one or more second layers, also referred to herein as barrier layers, gas barrier polymers, or gas barrier layers. The second layers may comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The first layer may be arranged to form an outer surface of the polymeric sheet. That is, the outermost first layer may be the outer surface of the bladder element 3140 or 3150. The bladder elements 3140, 3150 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. Each sheet may also be a flexible microlayer membrane that includes alternating layers of a gas barrier polymer material such as second layers and an elastomeric material such as first layers, as disclosed in U.S. Pat. Nos. 6,082,025 and 6,127,026 to Bonk et al. which are incorporated by reference in their entireties. Additional suitable materials for the bladder elements 3140, 3150 are disclosed in U.S. Pat. Nos. 4,183,156 and 4,219,945 to Rudy which are incorporated by reference in their entireties. Further suitable materials for the bladder elements 3140, 3150 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder elements 3140, 3150, engineering properties such as tensile strength, stretch properties, fatigue characteristics, dynamic modulus, and loss tangent can be considered. When the bladder element 3140 or 3150 is formed from sheets, the thicknesses of the sheets used to form the bladder element 3140 or 3150 can be selected to provide these characteristics.

Forefoot bladder element 3140 and heel bladder element 3150 are formed from a polymer material that encloses a fluid, which may be a gas, liquid, or gel. During walking and running, for example, forefoot bladder element 3140 and heel bladder element 3150 may compress between the foot and the ground, thereby attenuating ground reaction forces. That is, after thermoforming, forefoot bladder element 3140 and heel bladder element 3150 are inflated and generally pressurized with the fluid to cushion the foot. FIG. 14 shows sealed inflation ports 3155 through which fluid is introduced into the interior cavities 3142, 3152 prior to sealing.

In some configurations, sole structure 3130 may include a foam layer, for example, that extends between upper 3120 and one or both of forefoot bladder element 3140 and heel bladder element 3150, or a foam element may be located within indentations in the lower areas of forefoot bladder element 3140 and heel bladder element 3150. In other configurations, forefoot sole structure 3131 may incorporate plates, moderators, lasting elements, or motion control members that further attenuate forces, enhance stability, or influence the motions of the foot. Heel sole structure 3132 also may include such members to further attenuate forces, enhance stability, or influence the motions of the foot.

Figure 21:
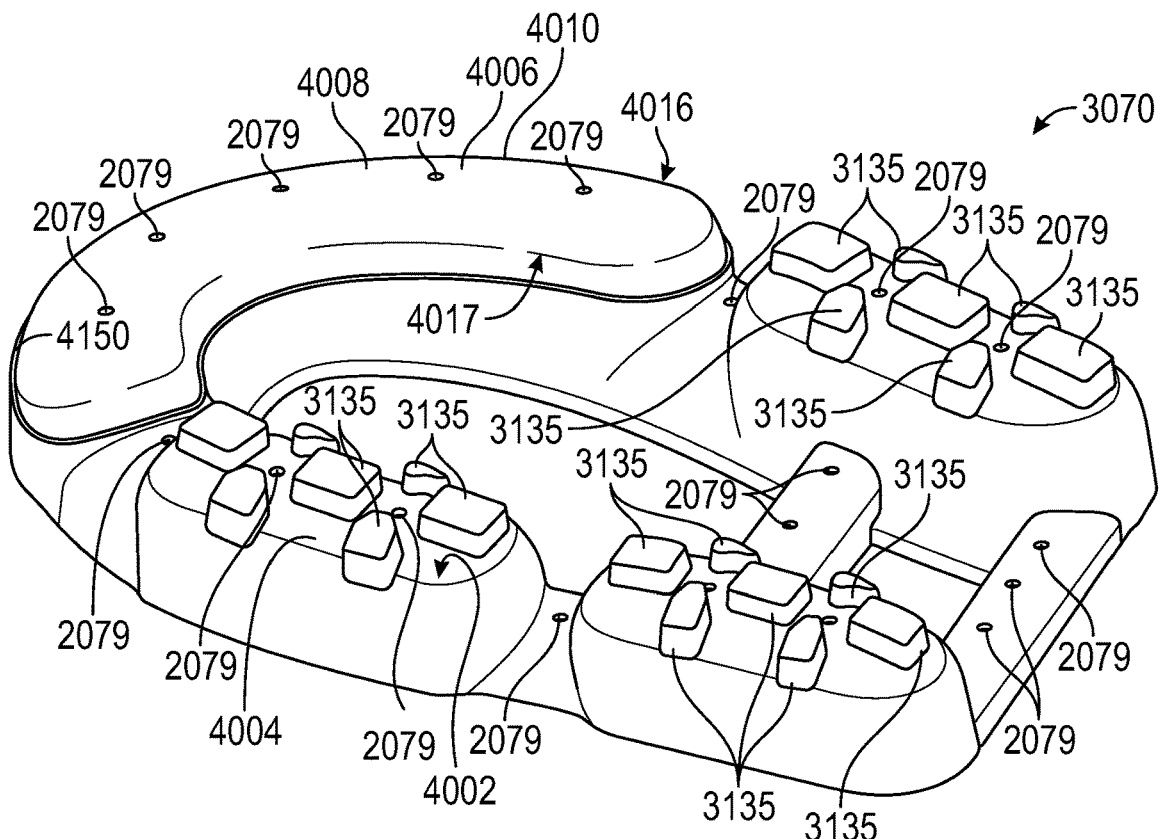
FIG. 21 is a perspective view of a lower surface of a first outsole component of the heel sole structure of FIG. 14.
Figure 22:
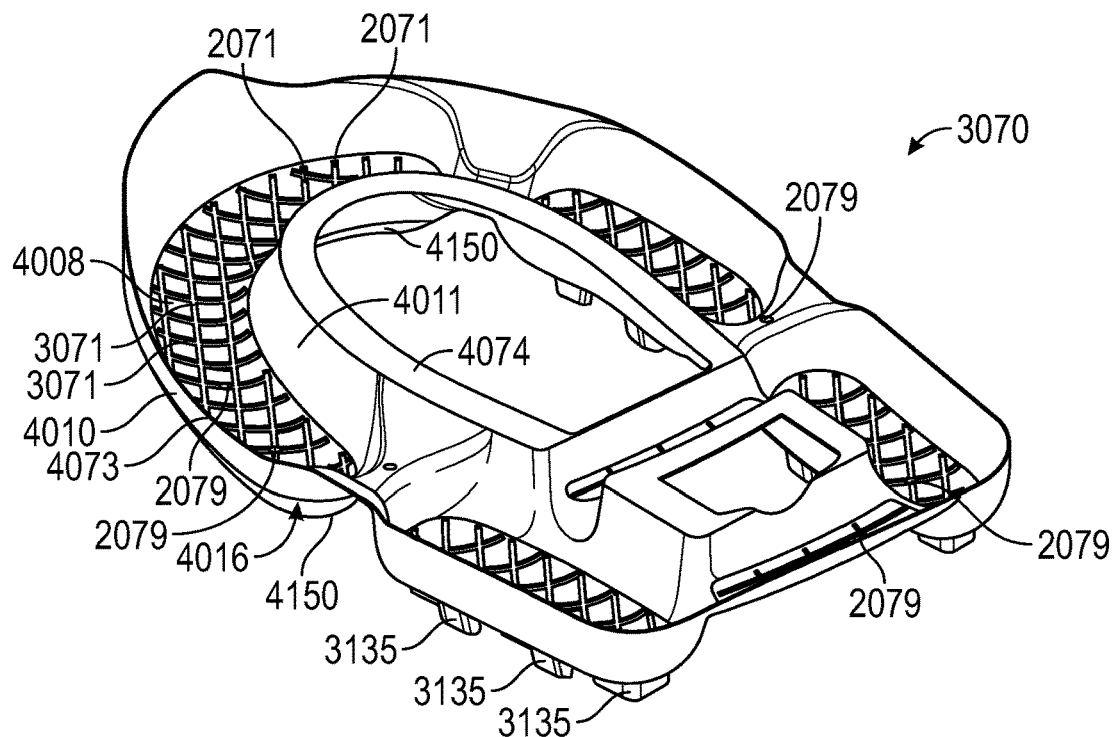
FIG. 22 is perspective view of an upper surface of the first outsole component of FIG. 21.

The forefoot sole structure 3131 also includes a first outsole component 3060 secured to the bladder element 3140, and multiple second outsole components 3062 secured to the first outsole component 3060 as described herein. The first outsole component 3060 is shown in isolation in FIGS. 17 and 18. The second outsole component 3062 is secured to the first outsole component in FIG. 14. The heel sole structure 3132 includes a first outsole component 3070, and a second outsole component 3072 secured to the first outsole component 3070 as described herein. The first outsole component 3070 is shown in FIGS. 21 and 22. The second outsole component 3072 is secured to the first outsole component 3070 as shown in FIG. 14. FIG. 15 shows the first outsole components 3060, 3070 secured to the bladder elements 3140 and 3150, with the second outsole components 3062, 3072 removed.

In addition to providing a wear surface (i.e., a ground-engaging surface) of an article of footwear, forefoot outsole component 3060 and heel outsole component 3070 may enhance various properties and characteristics of sole structure 3130. Properties and characteristics of the outsoles, such as the thickness, flexibility, the properties and characteristics of the material used to make the outsole, and stretch, may be varied or selected to modify or otherwise tune the cushioning response, compressibility, flexibility, and other properties and characteristics of sole structure 3130. In the embodiment shown, the first outsole components are a first material and the second outsole components are a second material different than the first material. The first outsole components 3060 and 3070 are injection molded thermoplastic polyurethane (TPU) components that are preformed with their desired shape and configuration by the injection molding process prior to being thermally bonded to the respective bladder element 3140, 3150 by the method described herein. The second outsole components 3062, 3072 are rubber and are preformed in their desired shape and then secured to the first outsole component 3060 or 3070 as described herein. First outsole component 3060 is a single, unitary, one-piece component, and first outsole component 3070 is a single, unitary, one-piece component. Each of the second outsole components 3062 and 3072 are also single, unitary, one-piece components.

Forefoot outsole component 3060 is secured to a lower surface of forefoot bladder element 3140. In some embodiments, forefoot sole structure 3131 may extend into a midfoot region. The forefoot outsole component 3060 also may be secured to lower areas of forefoot bladder element 3140 in a midfoot region. Heel outsole component 3070 is secured to lower areas of heel bladder element 3150. Both heel bladder elements 3150 and heel outsole component 3070 may extend into a midfoot region. Forefoot outsole component 3060 and heel outsole component 3070 may be formed from a wear-resistant material. The wear-resistant material may be transparent or translucent to provide a visually appealing effect. The wear-resistant material may be textured on the ground-engaging surface to impart traction, such as by including integral tread elements 3135, 3091 as described herein. Any or all of the components of forefoot sole structure 3131 and heel sole structure 3132 may be translucent or transparent, and may be colored or patterned for aesthetic appeal.

Figure 17:
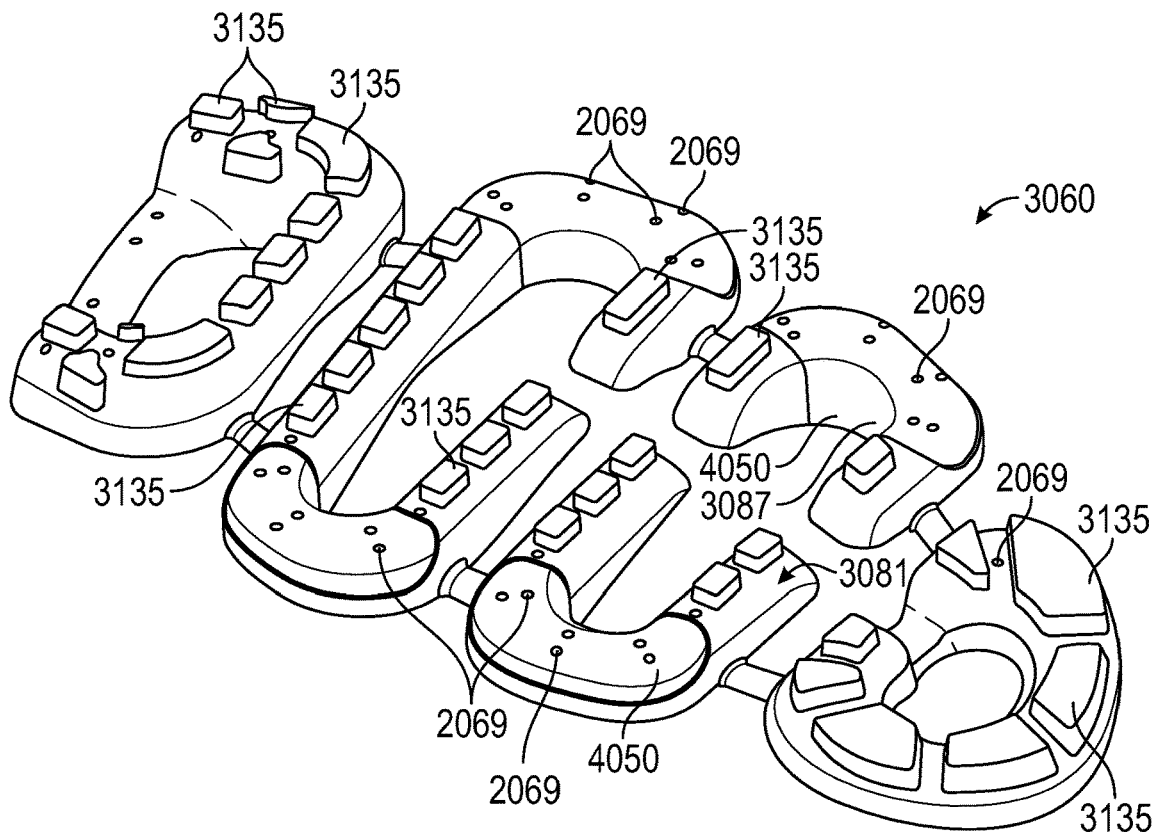
FIG. 17 is a perspective view of a lower surface of a first outsole component of the forefoot sole structure of FIG. 14.
Figure 18:
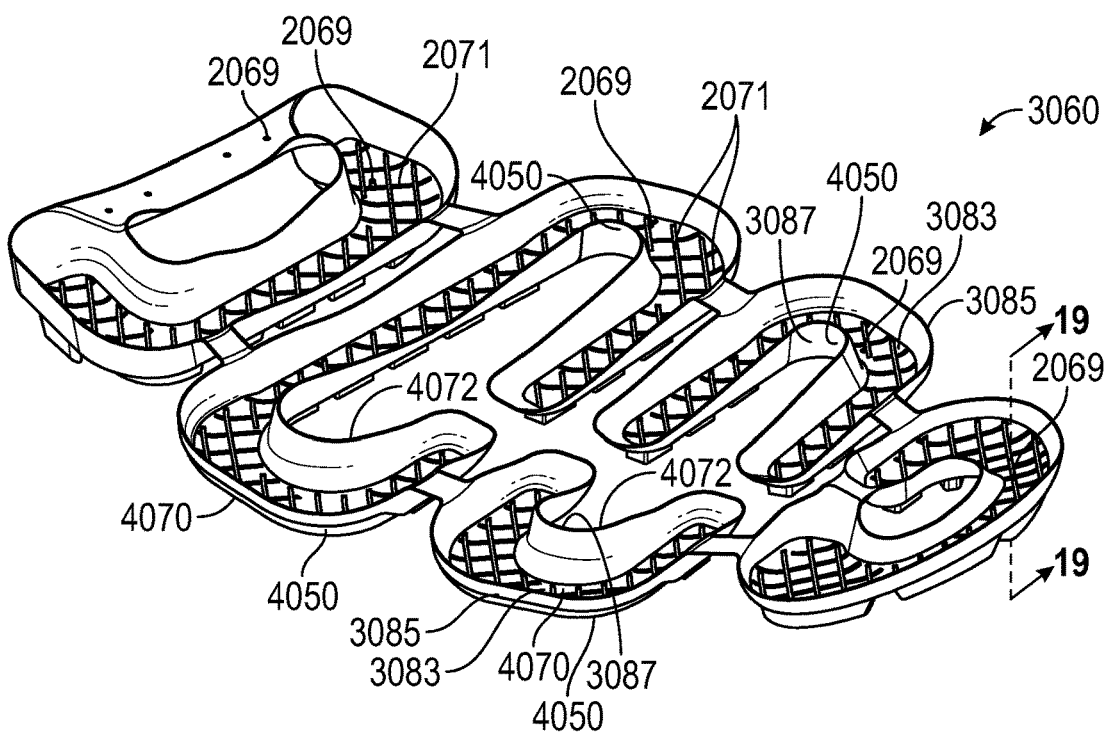
FIG. 18 is perspective view of an upper surface of the first outsole component of FIG. 17.
Figure 19:
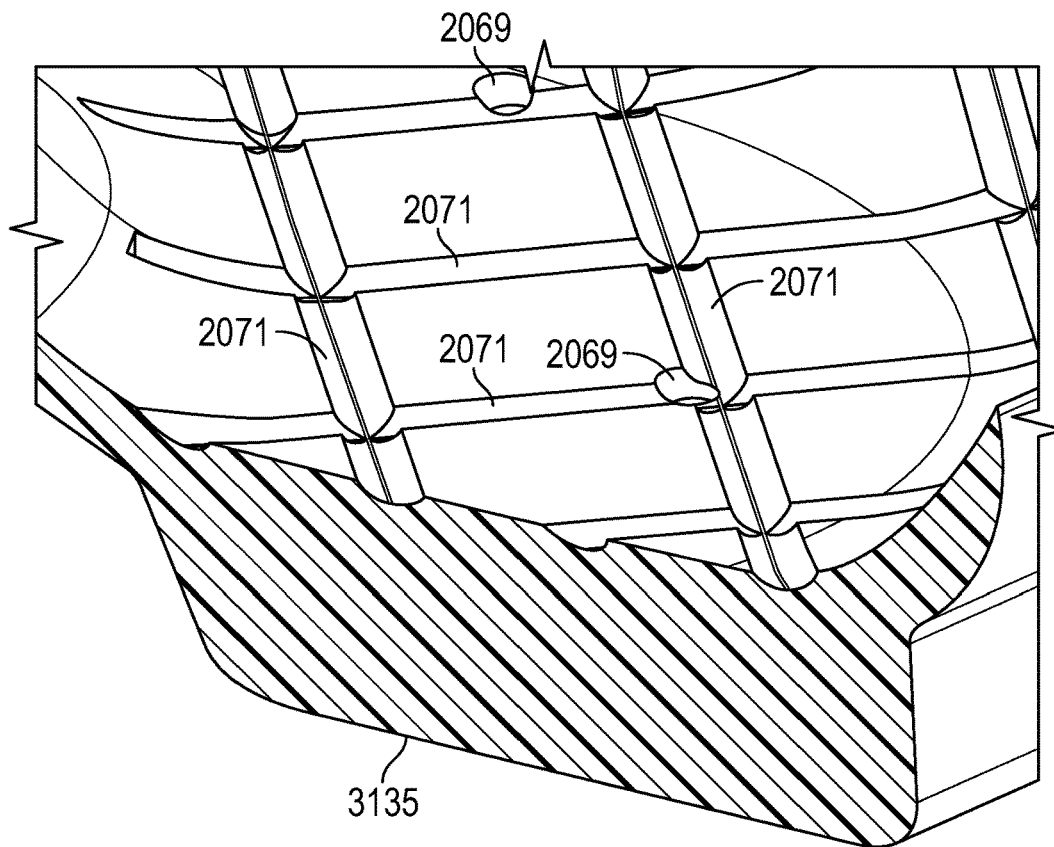
FIG. 19 is a cross-sectional perspective illustration of the first outsole component of FIG. 18 taken at lines 19-19 in FIG. 18.

FIGS. 14, 17 and 18 also illustrate gas escape openings 2069 in the first outsole component 3060 of the forefoot sole structure 3131, and FIGS. 14, 21, and 22 illustrate gas escape openings 2079 in the first outsole component 3070 of the heel sole structure 3132 only some of which are indicated with reference numbers. These gas escape openings allow air or other gases trapped between a bladder element and the corresponding outsole component during manufacturing to escape. The inside surface of an outsole component may be shaped in a manner that may accumulate trapped gas and direct the entrapped gas to a gas escape opening. For example, small interconnected grooves 2071 may be formed on the inside surface of the outsole component 3060 during injection molding, or may be provided in the surface by removal of material after molding. The gas escape openings 2069 are in the bottom of the grooves 2071, as shown in FIG. 19. The second outsole component 3070 also has grooves 2071 on the inner surface, as shown in FIG. 22, that direct entrapped gas to the gas escape openings 2079. The gas escape openings 2079 are in fluid communication with the grooves 3071.

Reinforcement of the outsole (for example, inclusion of structural elements, such as ribs), apertures, the height of the walls of the outsole, the number and location of the walls of outsole and walls of the bladder elements (also referred to as edges of the bladder elements) that overlap, or other features of an outsole all may be used to tune the responses of the sole structure. In particular, overlap of a wall of an outsole component with the side walls of a forefoot bladder element or a heel bladder element, or with the sidewalls of an underlying outsole component, such as described and illustrated at least in FIGS. 14-28, may be used to tune the elastic response and cushioning response of the resultant sole structure. With the guidance provided herein, these and other properties and characteristics of the outsole in combination with the properties and characteristics of the fluid-filled bladder elements can be selected and configured to provide a desired cushioning response.

In the embodiment shown in FIGS. 14-28 and manufactured as described with respect to FIGS. 25-28, the configuration of the first outsole components 3060 and 3070 supports the respective bladder elements 3140 and 3150 and allows a second outsole component 3062 or 3072 to be received and nested partially within a recess 4050 in the first outsole component 3060, or within a recess 4150 in the first outsole component 3070. The recesses 4050 and 4150 provide positioning guidance during assembly and, as discussed herein, protect the second outsole components 3062 and 3072 from delamination during wear. Moreover, both the first outsole components 3060, 3070 and the second outsole components 3062, 3072 have tread elements 3135, 3091, respectively, that establish a ground-engaging surface of the sole structure (contacting the ground G in FIG. 24), enabling different tractive properties to be provided at the locations of the tread elements 3135, 3091, by using different shapes, sizes of the tread elements 3135, 3091, and/or by using different materials for the first and second outsole components 3060 and 3062. The tread elements 3135, 3091 may be protrusions, ridges, or ground-engaging lugs or sections that impart traction. As shown in FIG. 14, the tread elements 3135 have different sizes and shapes including rectangular and trapezoidal. The tread elements 3091 are generally larger than the tread elements 3135. Depending on the materials used for the outsole components 3060, 3062, 3070, 3072, the second outsole components 3062, 3072 may provide increased traction relative to the first outsole components 3060, 3070, or decreased traction.

The tread elements 3135 of the first outsole component 3060, 3070 are an integral portion of the first outsole component (i.e., formed together with the base and walls by injection molding of the first outsole component) as best shown in FIGS. 17 and 20, and the tread elements 3091 of the second outsole component 3062 or 3072 are likewise an integral portion of the one-piece, unitary second outsole component 3062 or 3072. Configuration of the outsole components in this manner simplifies manufacturing and lessens the possibility of separation of the tread elements from the base of the outsole component during wear.

Figure 23:
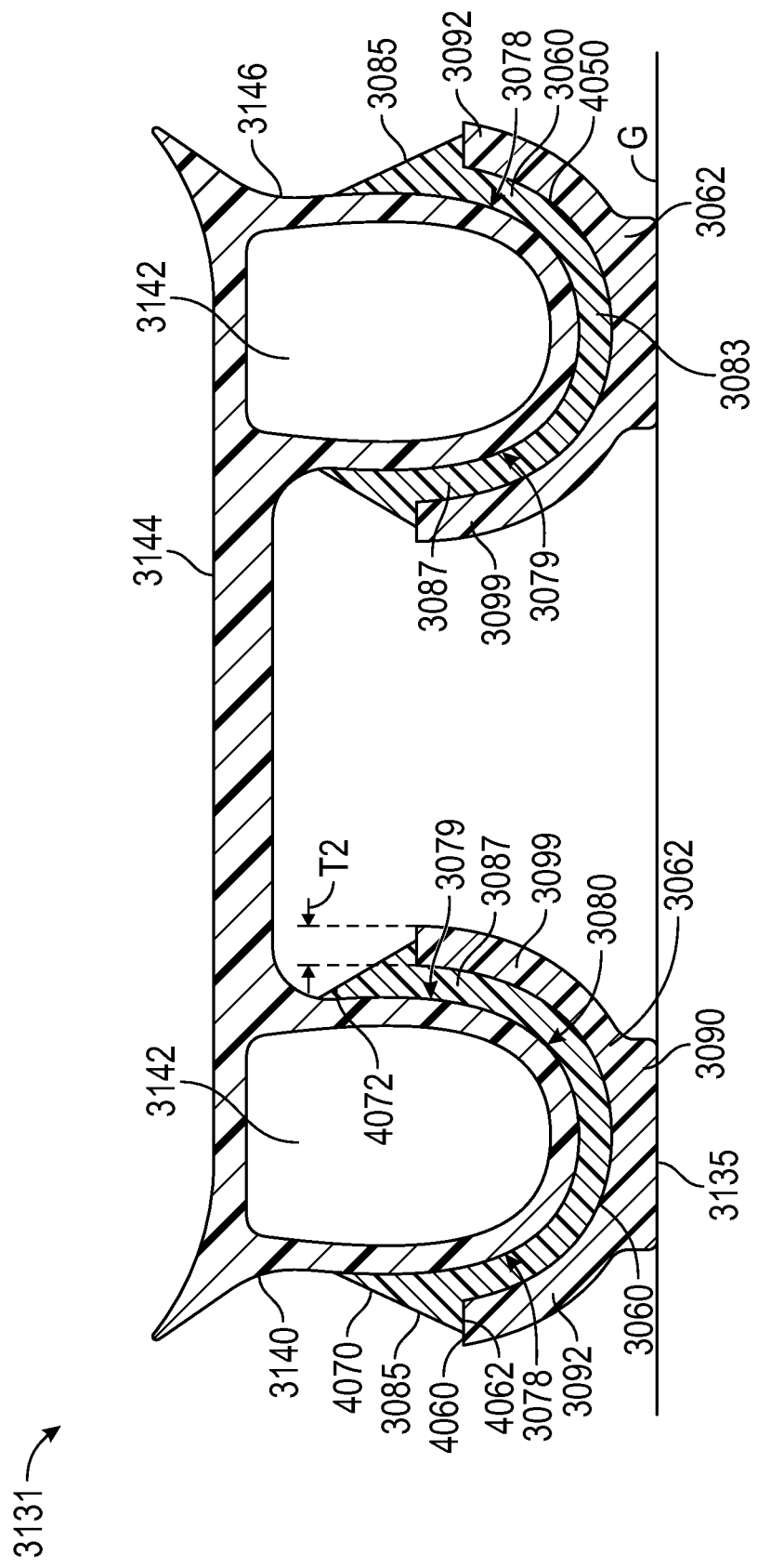
FIG. 23 is a cross-sectional view of the sole structure of FIG. 14 taken at lines 23-23 in FIG. 14.

FIGS. 17 and 18 show the first outsole component 3060 prior to attachment of the second outsole component 3062. FIGS. 21 and 22 show the first outsole component 3070 prior to attachment of the second outsole component 3072. FIGS. 23 and 24 show the first outsole component 3060 attached to a bottom surface 3080 of the bladder element 3140 and to side surfaces 3078, 3079 of the bladder element 3140. More specifically, the first outsole component 3060 has a first base 3083 attached to the bottom surface 3080 of the bladder element 3140, a first wall 3085 integral with the first base 3083 secured to a side surface 3078 of the bladder element 3140, and a second wall 3087 integral with the first base 3083 and secured to a side surface 3079 of the bladder element 3140. As indicated by the location of the cross-sections of FIGS. 23 and 24 in FIG. 14, and as shown in FIG. 18, the first wall 3085 and the second wall 3087 are at the arcuate portion of the fluid-filled interior cavity 3142. The second wall 3092 of the second outsole component 3062 is at the arcuate portion.

The first outsole component 3060 has integral tread elements 3135 at predetermined portions of the bottom surface 3081 of the first outsole component, while other portions are free from tread elements. FIG. 24 shows a base 3083 of the first outsole component 3060 attached to the first bladder element 3140 and having integral tread elements 3135 at first portion 3082 of a bottom surface 3081 of base 3083. Second portion 3084 of the bottom surface 3081 of base 3083 is free from any tread elements 3135. The other portion of the first outsole component 3060 shown attached to the bladder element 3140 also has a base 3083 and walls 3085, 3087 integral with the base 3083, with a first portion 3082 of the base 3083 with integral tread elements 3135 and a second portion 3084 free from any tread elements. At least some of the tread-free portions are free from tread elements 3135 specifically because a second outsole component 3062 with its own integral tread element(s) is to be attached at the second portion 3084, as shown in FIG. 14. As such, no tread elements of the first outsole component 3060 will interfere with attachment of the second outsole component 3062.

The second outsole component 3062 has a second base 3090 and optionally includes one or more integral tread elements 3091. The second base 3090 is secured to the second portion 3084 of the bottom surface 3081 of the first base 3083. The second outsole component 3062 has a second wall 3092 integral with the second base 3090. The second wall 3092 is secured to the outer surface 3094 of the first wall 3085 of the first outsole component 3060. The outer surface 3094 is adjacent the second portion 3084 of the bottom surface 3081. With this configuration, a ground-engaging surface 3098 of the sole structure 3131 includes integral tread elements 3135 of the first outsole component 3060, and integral tread elements 3091 of the second outsole component 3062.

Similarly, as best shown in FIGS. 21 and 22, the first outsole component 3070 of the heel sole structure 3132 has integral tread elements 3135 at predetermined portions of the bottom surface 4002 of the first outsole component 3070, such as at first area 4004, and has a second area 4006 free from any tread elements. The first outsole component 3070 has a first base 4008 and an integral first wall 4010 extending from the first base adjacent the second area 4006. The first wall 4010 is an outer wall. The first outsole component 3070 also has a second wall, referred to as an inner wall 4011, which is integral with the first base 4008.

The second outsole component 3072 has a second base 4012 secured to the first base 4008. The second outsole component 3072 has a second wall 4014 (i.e., outer wall) integral with the second base 4012 and secured to the outer surface 4016 of the first wall 4010. The second outsole component 3072 has an inner wall 4015 integral with the second base 4012 and secured to the outer surface 4017 of the second wall 4011 as is evident in FIGS. 14, 15, and 21.

As best shown in FIG. 23, the first outsole component 3060 has an arcuate shape corresponding to the arcuate shape of the fluid-filled interior cavity 3142 with the first wall 3085 at the outer periphery of the arcuate portion of the fluid-filled interior cavity 3142. The second wall 3092 of the second outsole component 3062 is also at the arcuate portion. The first wall 3085 and second wall 3092 are thus outer walls. The second wall 3087 of the first outsole component 3060 is an inner wall located at the inner curve of the arcuate portion. The inner wall 3099 of the second outsole component 3062 is also at the inner curve of the arcuate portion. Supporting the tubular arcuate portions of the bladder elements with the outer and inner walls of the outsole components 3060, 3070 provides support, acting as a geometric constraint on the bladder element 3140, and provides stiffness, tuning the cushioning response of the bladder element 3140.

Reinforcement of the outsole components 3060, 3062, 3070, 3072 (for example, inclusion of structural elements, such as ribs), apertures, the height of the walls 3085, 3087, 3092, 3099 of the outsole components 3060, 3062, 3070, 3072, the number and location of overlapping walls of outsole components 3060, 3062, 3070, 3072 and of the bladder elements 3140, 3150 (also referred to as edges of the bladder elements), or other features of outsole components 3060, 3062, 3070, 3072 all may be used to tune the responses of the sole structures 3131 and 3132. In particular, overlap of a wall 3085, 3087, 4010, 4011 of a first outsole component 3060, 3070 away from the respective base portion 4008 and up the side surface 3078, 3079 of a forefoot bladder element 3140, or the side surface of a heel bladder element 3150, and overlap of a wall 3092, 3099, 4014 of a second outsole component 3062, 3072 away from the respective base portion and up the wall 3085, 3087, 4010, 4011 of the respective first outsole component 3060, 3070 such as described and illustrated at least in FIGS. 15-24, may be used to tune the elastic response and cushioning response of the resultant sole structure 3131, 3132. With the guidance provided herein, these and other properties and characteristics of the outsole components 3060, 3062, 3070, 3072 in combination with the properties and characteristics of the fluid-filled bladder elements 3140, 3150 can be selected and configured to provide a desired cushioning response.

Figure 25:
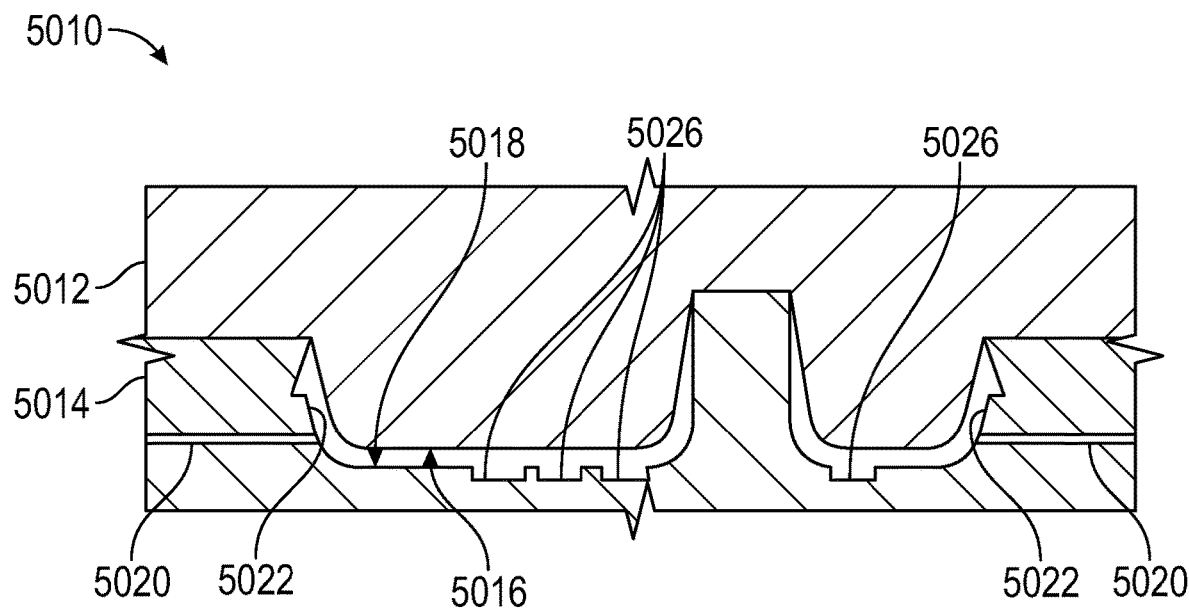
FIG. 25 is a cross-sectional view of an injection mold for the first outsole component of FIG. 17.
Figure 26:
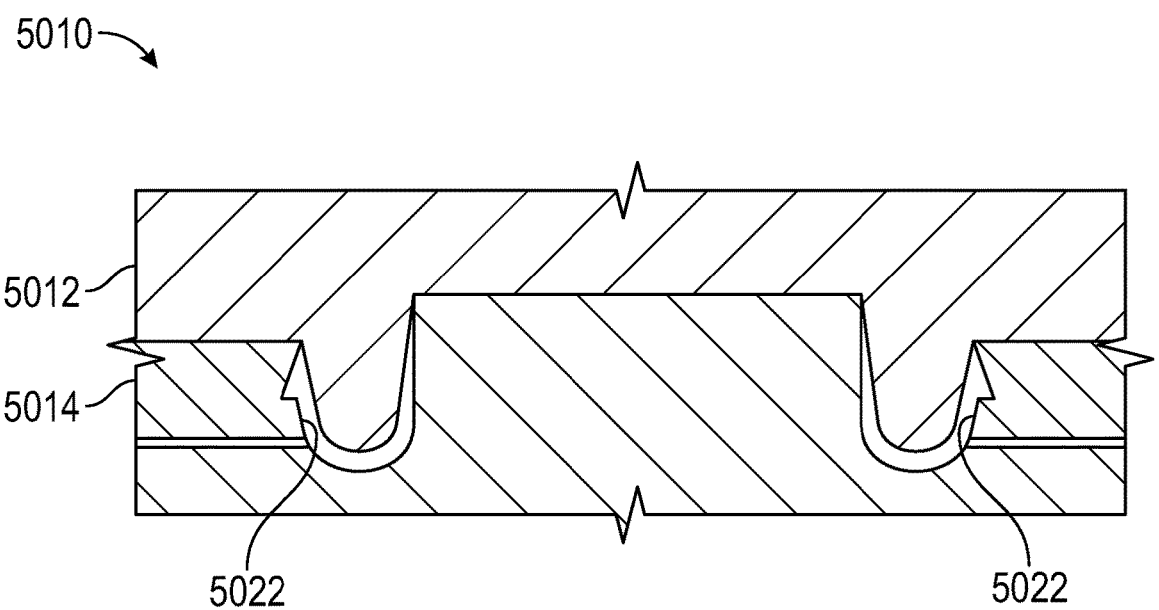
FIG. 26 is a cross-sectional view of an injection mold for the first outsole component of FIG. 22.

The first outsole component 3060 and the second outsole component 3062 are cooperatively configured to fit together to assist with locating the second outsole component 3062 on the first outsole component 3060 and to reduce the possibility of the second outsole component 3062 separating from the first outsole component 3060 during wear. More specifically, and as best shown in FIG. 24, the outer surface of 3094 the first wall 3085 of the first outsole component 3060 has a recess 4050. When the forefoot sole structure 3131 is thermoformed, the recess 4050 is adjacent the second portion 3084 of the bottom surface 3081 of the first outsole component 3060 as shown in FIG. 24. With reference to FIGS. 25 and 26, the recess 4050 is provided due to the shape of the injection mold 5010 in which the first outsole component 3060 is injection molded. In an embodiment, the injection mold 5010 may have upper and lower molds 5012, 5014 with mold surfaces 5016, 5018, respectively. TPU material is injected through ports 5020 in molding the first outsole component 3060 to the contours of the mold surfaces 5016, 5018. A protrusion 5022 in the lower mold 5014 causes the recess 4050 in the first wall 3085 of the medial side of the first outsole component 3060. A similar protrusion 5022 causes the recess 4050 in the first wall 3085 of the lateral side of the first outsole component 3060. The mold surface 5018 also has recesses 5026 that create the tread elements 3135. Additionally, the mold surfaces 5016, 5018 are shaped so that the second walls 3087 (i.e., the inner walls) of the first outsole component 3060 have a greater height than the first walls 3085 (i.e., the outer walls) of the first outsole component 3060 and so that an upper end 4070, 4072 of the walls 3085, 3087 are tapered.

The second wall 3092 of the second outsole component 3062 is configured so that it can fit in and be secured to the outer surface of the first wall 3085 of the first outsole component 3060 in the recess 4050. The first outsole component 3070 and the second outsole component 3072 of the heel sole structure 3132 are cooperatively configured in the same manner.

Moreover, as shown in FIG. 24, the second wall 3092 has a first thickness T1 and the recess 4050 has a first depth D1. The first thickness T1 is greater than the first depth D1 so that second outsole component 3062 protrudes outward of the first outsole component 3060 at the first wall 3085. The upper edge 4060 of the second outsole component 3062 is abutted against or just below a lip 4062 of the first outsole component 3060 in the recess 4050. The lip 4062 protects the upper edge 4060 from direct applied forces during use, reducing the possibility of delamination or other dislocation of the second outsole component 3062.

As best shown in FIG. 23, the inner wall 3099 of the second outsole component 3062 extends upward from the second base 3090 of the second outsole component further than the second wall 3092 (i.e. the outer wall) of the second outsole component. Support for the bladder element 3040 at the inner wall 3099 is desirable to limit inward movement of the bladder element 3040 during compression and deformation. The second outsole component 3072 of the bladder element 3050 may be similarly configured, with inner walls that extend upward along inner walls of the first outsole component 3070 further than outer walls.

In the embodiment shown, the recess 4050 extends across the bottom surface and up the outer surface of the inner wall 3087 of the first outsole component 3060. Accordingly, only a portion of the thickness T2 of the inner wall 3099 of the second outsole component 3062 protrudes from the outer surface of the inner wall 3087 of the first outsole component 3060 as shown in FIG. 23. Alternatively, the recess 4050 may end at the bottom surface so that the inner wall 3087 may be configured without a recess. Both the outer wall 3085 and the inner wall 3087 of the first outsole component 3060 have a tapered upper end 4070, 4072, shown in FIG. 18, helping to prevent delamination of the first outsole component 3060 from the bladder element 3140. The first outsole component 3070 is similarly configured with a tapered upper end 4073 at the first wall 4010. The upper end 4074 of the first outsole component 3070 continues up the inner wall of the tubular portion of the lower polymer sheet 3146 of the bladder element 3050 to the lower surface of the lower polymer sheet 3146 adjacent the tubular portion as indicated in FIGS. 14 and 22, providing maximum support against the inner wall of the bladder element 3150.

A method of manufacturing an article of footwear that includes the sole structure 3131 and/or the sole structure 3132 as described above includes placing a preformed first outsole component 3160 into a thermoforming mold 6012, 6014. In FIG. 27, the thermoforming mold is schematically depicted as including an upper mold 6012 and a lower mold 6014. As described with respect to FIGS. 25 and 26 and shown in FIGS. 17 and 18, the first outsole component 3060 is preformed with a base 3083 having integral tread elements 3135 protruding from a first portion 3082 of a bottom surface 3081 of the base, with a second portion 3084 of the bottom surface 3081 free of any tread elements, and with a wall 3085 integral with the base 3083 and adjacent the second portion 3084 of the bottom surface. As used herein, "preformed" means that the first outsole component 3060 has the features prior to the thermoforming process (i.e., prior to placement in the thermoforming mold 6012, 6014).

In an embodiment, the lower mold 6014 may have one or more positioning markers to orient the first outsole component 3060. As shown in FIG. 27, the second mold surface 6018 has a positioning marker 6024, and placing the first outsole component 3060 into the lower mold 6014 includes placing a predetermined portion of the first outsole component 3060 at the positioning marker 6024, thereby orienting the first outsole component 3060 in a predetermined position in the thermoforming mold 6014. The positioning marker 6024 is a cavity in the second mold surface 6018, and the predetermined portion of the first outsole component 3060 is one of the tread elements 3135. Other alternative positioning markers may be used instead of or in addition to positioning marker 6024.

The method further includes placing polymeric material in the thermoforming mold 6012, 6014 with the first outsole component 3060. The polymeric material may be a first polymeric sheet 3144 and a second polymeric sheet 3146 also referred to as an upper polymeric sheet and a lower polymeric sheet due to their relative positions in the completed article of footwear. Alternatively, the polymeric material may be a preform (e.g., polymeric material not in sheet form).

Figure 28:
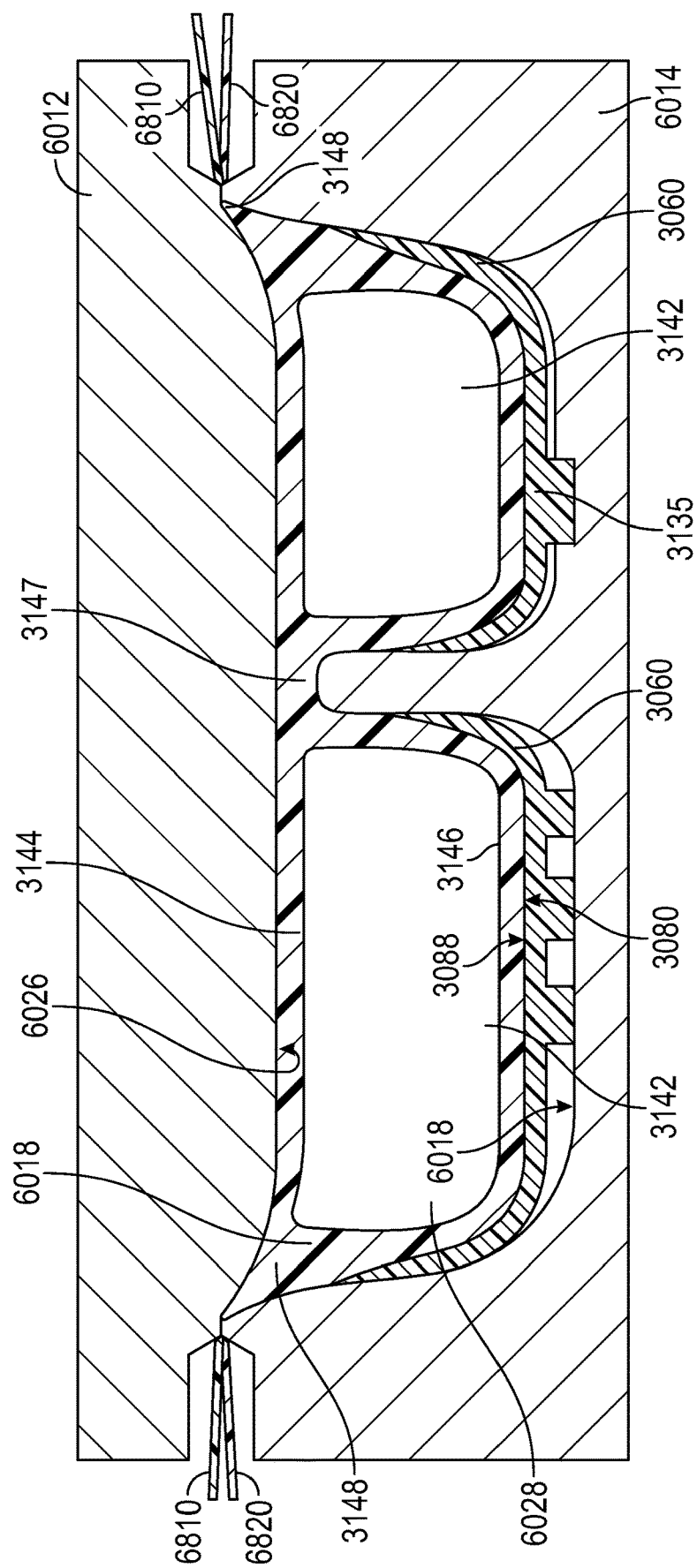
FIG. 28 is a cross-sectional view of the mold and components of FIG. 27 with the mold in a closed position.

The thermoforming mold 6012, 6014 is then closed by placing the upper and lower molds 6012, 6014 together as shown in FIG. 28 to enclose the polymeric material (i.e., an enclosed portion of the sheets 3144, 3146 and the first outsole component 3060 in a mold cavity 6028 defined between the mold surface 6026 of the upper mold 6012 and the mold surface 6018 of the lower mold 6014. The method then includes forming the sheets 3144, 3146 by a combined thermoforming and vacuuforming process, which includes applying a vacuum to conform a first portion of the polymeric material (i.e., the enclosed portion of the first sheet 3144) to the first mold surface (i.e., the surface 6026) of the thermoforming mold and conform a second portion of the polymeric material (i.e., the bottom surface 3080 of the enclosed portion of the second sheet 3146) to an upper surface 3088 of the first outsole component 3060 and to the second mold surface 6018 with the interior cavity 3142 between the first sheet 3144 and the second sheet 3146. In FIG. 28, the lip 4062 of the first outsole component 3060 is not apparent as it is compressed against the mold surface 6018. The interior cavity 3142 may be inflated after the thermoforming process is complete (i.e., after removal of the bladder element 3140 and first outsole component 3060 from the thermoforming mold 6012, 6014). Gaps may exist between the bottom surface of the first outsole component 3060 and the mold surface 6018 to ease removal of the sole surface after thermoforming.

In an embodiment in which the polymeric material is the first and second polymer sheets 3144, 3146, the method then includes thermally bonding the first polymeric sheet 3144 to the second polymeric sheet 3146 to enclose the interior cavity 3142, and thermally bonding the lower surface 3080 of the second polymer sheet 3146 to the upper surface 3088 of the first outsole component.

The first and second polymer sheets 3144, 3146 are thermally bonded to one another around the peripheral flange 3148 formed between the pinch surface 6030 and the seam-forming surface 6070 and at web areas 3147 between the portions of the fluid-filled interior cavity 3142. As the mold 6012, 6014 closes, pinch surface 6030 contacts and slides against a portion of second seam-forming surface 6070. The contact between pinch surface 6030 and second seam-forming surface 6070 effectively severs excess portions 6810, 6820 of first and second polymer sheets 3144, 3146 from portions that form bladder element 3140. The material forming first polymer sheet 3144 and second polymer sheet 3146 compacts or otherwise collects to form flange 3148. In addition to forming flange 3148, first polymer sheet 3144 and second polymer sheet 3146 are (a) shaped to produce bladder element 3140 and (b) compressed and joined to produce web area 3147.

The thermoformed sheets 3144, 3146 are allowed to cool, and then the mold 6012, 6014 is opened by separating the upper and lower molds 6012, 6014, and the thermally bonded upper and lower polymer sheets 3144, 3146 and first outsole component 3060 are removed from the mold 6012, 6014 as a unit after a predetermined cooling period. If the mold 6012, 6014 is configured to mold multiple sole structures 3131, 3132 simultaneously, additional trimming may be necessary around the flange 3148 or between the adjacent sole structures. The bladder element 3140 with the attached first outsole component 3060 may be inflated after thermoforming and prior to attachment of the second outsole component 3062, or may be inflated after attachment of the second outsole component 3062.

After the first outsole component 3060 is attached to the bladder element 3140, the second outsole component 3062 is positioned on the second portion 3084 of the bottom surface 3080 of the first outsole component 3060. Positioning the second outsole component 3062 is by nesting the second outsole component 3062 in the recess 4050. Nesting includes abutting the upper edge 4060 of the second outsole component 3062 against the lip 4062 of the first outsole component 3060 at an upper extent of the recess 4050, as indicated with respect to one of the outsole components 3062 in FIG. 15. The upper edge 4060 of the second outsole component 3062 is abutted against a lip 4062 of the first outsole component 3060 in the recess 4050, as shown in FIGS. 15, 23, and 24. The second outsole component 3062 is adhered to the first outsole component 3060. As shown in FIG. 15, the footwear upper 3120 is then secured to the upper surface 4041 of the first polymer sheet 3144. In FIG. 15, the flange 3148 is shown at the lateral side of the sole structure 3130 and is adhered to the lower lateral side of the upper 3120.

The method has been described with respect to the forefoot sole structure 3131. The method may also include injection molding the first outsole component 3070, vacuum/thermoforming the bladder element 3150 and thermally bonding the first outsole component 3070 to the bladder element 3150 in a thermoforming mold, attaching the second outsole component 3072 to the first outsole component 3070 as described, and then securing the heel sole structure 3132 to the heel region of the upper 3120 with a forward edge 3110 of the heel sole structure adjacent a rearward edge 3112 of the forefoot sole structure as shown in FIGS. 14 and 15.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:

1. A method of manufacturing an article of footwear comprising:
   placing a preformed first outsole component in a thermoforming mold; wherein the preformed first outsole component has:
      a base with integral tread elements protruding from a first portion of a bottom surface of the base, and with a second portion of the bottom surface free of any tread elements; and
      an outer wall integral with the base and adjacent the second portion of the bottom surface and an inner wall integral with the base;
   placing a first polymeric sheet and a second polymeric sheet in the thermoforming mold with the first outsole component;
   closing the thermoforming mold to enclose the first polymeric sheet, the second polymeric sheet, and the first outsole component in a mold cavity;
   applying a vacuum to conform the first polymeric sheet to a first mold surface of the thermoforming mold and to conform the second polymeric sheet to an upper surface of the first outsole component and to a second mold surface of the thermoforming mold, thereby defining an interior cavity between the first polymeric sheet and the second polymeric sheet;
   thermally bonding the first polymeric sheet to the second polymeric sheet to enclose the interior cavity;

thermally bonding a lower surface of the second polymer sheet to the upper surface of the first outsole component;

removing the first polymer sheet, the second polymer sheet, and the first outsole component from the thermoforming mold as a unit;

positioning a second outsole component on the second portion of the bottom surface of the base; and adhering the second outsole component to the first outsole component so that the second outsole component extends along the bottom surface of the base, partway up the outer wall, and partway up the inner wall.

2. The method of claim 1, wherein removing the first polymeric sheet, the second polymeric sheet, and the first outsole component from the thermoforming mold as a unit is performed after a predetermined cooling period.

3. The method of claim 1, wherein:
the first outsole component has a recess; and
said positioning the second outsole component is performed by nesting the second outsole component in the recess.

4. The method of claim 3, wherein said nesting includes placing an upper edge of the second outsole component along a lip of the first outsole component at an upper extent of the recess.

5. The method of claim 4, wherein:
the recess extends along the bottom surface of the base, partway up the outer wall, and further up the inner wall than the outer wall.

6. The method of claim 1, wherein, after adhering the second outsole component to the first outsole component, the first polymeric sheet, the second polymeric sheet, the first outsole component, and the second outsole component are configured as a forefoot sole structure, the method further comprising:
securing the forefoot sole structure to a forefoot region of a footwear upper; and
securing a heel sole structure to a heel region of the footwear upper with a forward edge of the heel sole structure adjacent a rearward edge of the forefoot sole structure.

7. The method of claim 1, further comprising:
securing a footwear upper to an upper surface of the first polymeric sheet.

8. The method of claim 1, wherein:
the second mold surface has a positioning marker; and
placing the first outsole component in the thermoforming mold includes placing a predetermined portion of the first outsole component at the positioning marker, thereby orienting the first outsole component in a predetermined position in the thermoforming mold.

9. The method of claim 1, wherein the second outsole component and the integral tread elements of the first outsole component together establish a ground-engaging surface of the article of footwear.

10. A method of manufacturing an article of footwear comprising:
placing a preformed first outsole component in a thermoforming mold; wherein the preformed first outsole component has:
a base with integral tread elements protruding from a first portion of a bottom surface of the base, and with a second portion of the bottom surface free of any tread elements; and
a wall integral with the base and adjacent the second portion of the bottom surface; wherein the first outsole component has a recess in an outer surface of the wall;

placing a first polymeric sheet and a second polymeric sheet in the thermoforming mold with the first outsole component;

closing the thermoforming mold to enclose the first polymeric sheet, the second polymeric sheet, and the first outsole component in a mold cavity;

applying a vacuum to conform the first polymeric sheet to a first mold surface of the thermoforming mold and to conform the second polymeric sheet to an upper surface of the first outsole component and to a second mold surface of the thermoforming mold, with an interior cavity between the first polymeric sheet and the second polymeric sheet;

thermally bonding the first polymeric sheet to the second polymeric sheet to enclose the interior cavity;

thermally bonding a lower surface of the second polymer sheet to the upper surface of the first outsole component;

removing the first polymeric sheet, the second polymeric sheet, and first outsole component from the thermoforming mold as a unit after a predetermined cooling period;

positioning a second outsole component on the second portion of the bottom surface of the base by nesting the second outsole component in the recess;

wherein said nesting includes placing an upper edge of the second outsole component along a lip of the first outsole component at an upper extent of the recess; and adhering the second outsole component to the first outsole component; wherein the wall is an outer wall, the first outsole component includes an inner wall integral with the base, and the recess extends along the bottom surface of the base, partway up the outer wall, and further up the inner wall than the outer wall.

11. The method of claim 10, wherein, after adhering the second outsole component to the first outsole component, the first polymeric sheet, the second polymeric sheet, the first outsole component, and the second outsole component are configured as a forefoot sole structure, the method further comprising:
securing the forefoot sole structure to a forefoot region of a footwear upper; and
securing a heel sole structure to a heel region of the footwear upper with a forward edge of the heel sole structure adjacent a rearward edge of the forefoot sole structure.

12. The method of claim 10, further comprising:
securing a footwear upper to an upper surface of the first polymeric sheet.

13. The method of claim 10, wherein the second mold surface has a positioning marker; and
placing the first outsole component in the thermoforming mold includes placing a predetermined portion of the first outsole component at the positioning marker, thereby orienting the first outsole component in a predetermined position in the thermoforming mold.

* * * * *